(12) United States Patent
Girard et al.

(10) Patent No.: US 7,027,141 B2
(45) Date of Patent: Apr. 11, 2006

(54) STATIC ATTITUDE DETERMINATION AND ADJUST OF HEAD SUSPENSION COMPONENTS

(75) Inventors: Mark T. Girard, South Haven, MN (US); Joseph P. Tracy, South Haven, MN (US); David R. Swift, Glencoe, MN (US); Ryan A. Jurgenson, Hutchinson, MN (US)

(73) Assignee: Applied Kinetics, Inc., Hutchinson, MN (US)

( * ) Notice: Subject to any disclaimer, the term of this patent is extended or adjusted under 35 U.S.C. 154(b) by 422 days.

(21) Appl. No.: 10/138,728

(22) Filed: May 3, 2002

(65) Prior Publication Data

US 2002/0171970 A1    Nov. 21, 2002

Related U.S. Application Data

(63) Continuation-in-part of application No. 09/938,321, filed on Aug. 23, 2001, now abandoned.

(60) Provisional application No. 60/288,258, filed on May 3, 2001.

(51) Int. Cl.
    *G01N 21/00* (2006.01)
(52) U.S. Cl. .................... 356/237.1; 356/614; 356/624
(58) Field of Classification Search ........... 356/64–624
    See application file for complete search history.

(56) References Cited

U.S. PATENT DOCUMENTS

| | | | |
|---|---|---|---|
| 4,603,567 A | 8/1986 | Smith et al. | |
| 4,866,836 A | 9/1989 | Von Brandt et al. | |
| 4,980,783 A | 12/1990 | Moir et al. | |
| 5,155,904 A | 10/1992 | Majd | |
| 5,172,468 A | 12/1992 | Tanaka et al. | |
| 5,194,918 A | * 3/1993 | Kino et al. .................. | 356/497 |
| 5,198,945 A | 3/1993 | Blaeser et al. | |
| 5,198,948 A | 3/1993 | Stover et al. | |
| 5,249,356 A | 10/1993 | Okuda et al. | |
| 5,282,102 A | 1/1994 | Christianson | |
| 5,297,413 A | 3/1994 | Schones et al. | |

(Continued)

FOREIGN PATENT DOCUMENTS

WO    WO 01/23133    4/2001

(Continued)

OTHER PUBLICATIONS

PCT International Search Report, PCT/US02/13967 (4 pages).

*Primary Examiner*—Hoa Q. Pham
(74) *Attorney, Agent, or Firm*—Kagan Binder, PLLC

(57) ABSTRACT

An apparatus and method for determining and adjusting the static attitude of a head suspension or a head suspension assembly for use in a dynamic storage device. An apparatus in accordance with the present invention includes a workpiece support and an adjust device, operatively positioned with respect to the workpiece support, for adjusting the head suspension. The adjust device includes first and second clamp portions for restraining a gimbal arm and an adjust body for deforming the restrained gimbal arm while the gimbal arm is restrained by the first and second clamp portions. A method in accordance with the present invention includes determining the planar orientation of a surface indicative of the static attitude of the slider mounting tongue or a slider mounted thereto and controllably deforming an individual gimbal arm of the flexure independently from another gimbal arm of the flexure to introduce a permanent deformation of the gimbal arm thereby adjusting the static attitude of the slider mounting tongue or slider if present.

26 Claims, 19 Drawing Sheets

U.S. PATENT DOCUMENTS

| | | |
|---|---|---|
| 5,371,939 A | 12/1994 | Ressmeyer et al. |
| 5,383,270 A | 1/1995 | Iwatsuka et al. |
| 5,391,842 A | 2/1995 | Bennin et al. |
| 5,473,488 A | 12/1995 | Gustafson et al. |
| 5,491,597 A | 2/1996 | Bennin et al. |
| 5,547,082 A | 8/1996 | Royer et al. |
| 5,608,590 A | 3/1997 | Ziegler et al. |
| 5,636,013 A | 6/1997 | Swift |
| 5,636,089 A | 6/1997 | Jurgenson et al. |
| 5,645,735 A | 7/1997 | Bennin et al. |
| 5,661,619 A | 8/1997 | Goss |
| 5,682,780 A | 11/1997 | Girard |
| 5,687,597 A | 11/1997 | Girard |
| 5,729,889 A | 3/1998 | Goss |
| 5,812,344 A | 9/1998 | Balakrishnan |
| 5,832,764 A | 11/1998 | Girard |
| 5,859,749 A | 1/1999 | Zarouri et al. |
| 5,865,978 A | 2/1999 | Cohen |
| 5,877,920 A | 3/1999 | Resh |
| 5,894,657 A | 4/1999 | Kanayama et al. |
| 5,912,787 A | 6/1999 | Khan et al. |
| 5,918,362 A | 7/1999 | Yamashita et al. |
| 5,929,987 A | 7/1999 | Hayes |
| 6,002,650 A | 12/1999 | Kuribayaski et al. |
| 6,011,239 A | 1/2000 | Singh et al. |
| 6,020,022 A | 2/2000 | Ejiri et al. |
| 6,071,056 A | 6/2000 | Hollowell |
| 6,130,863 A | 10/2000 | Wang et al. |
| 6,146,813 A | 11/2000 | Girard et al. |
| 6,154,952 A | 12/2000 | Tangren |
| 6,266,869 B1 | 7/2001 | Tracy et al. |
| 6,466,257 B1 | 10/2002 | Baugh et al. ............... 348/95 |
| 6,690,473 B1 * | 2/2004 | Stanke et al. ............. 356/601 |

FOREIGN PATENT DOCUMENTS

| | | |
|---|---|---|
| WO | WO 01/71437 | 9/2001 |

* cited by examiner

STATIC ATTITUDE DETERMINATION AND ADJUST OF HEAD SUSPENSION COMPONENTS This application claims the benefit of U.S. Provisional Application Ser. No. 60/288,258, filed May 3, 2001, entitled "APPARATUS FOR IMPROVED STATIC ANGLE MEASUREMENTS", which application is incorporated herein by reference in its entirety.

This application is a continuation-in-part of U.S. patent application Ser. No. 09/938,321, filed Aug. 23, 2001 now abandoned, entitled "METHODS AND DEVICE FOR AUTOMATED STATIC ATTITUDE AND POSITION MEASUREMENT AND STATIC ATTITUDE ADJUST OF HEAD SUSPENSION ASSEMBLIES", which application is incorporated herein by reference in its entirety.

FIELD OF THE INVENTION

The present invention relates to determining and adjusting the static attitude of some portion of a head suspension or a slider in a head suspension assembly, which head suspension assemblies are generally utilized in dynamic storage devices such as magnetic disk drives.

BACKGROUND OF THE INVENTION

Components of many electronic, electromechanical, optical or other devices need to be assembled with precise alignment to assure optimal performance. In the case of certain magnetic recording disk drives, for example, the read/write head needs to be carefully positioned during disk usage with respect to the surface of the disk to assure optimum performance and to avoid crashing into the disk and causing damage.

Magnetic recording hard disk drives that utilize a head assembly for reading and/or writing data on a rotatable magnetic disk are well known in the art. In such systems, the head assembly is typically attached to an actuator arm by a head suspension assembly comprising a head suspension and an aerodynamically designed slider onto which a read/write head is provided so that the head assembly can be positioned very close to the disk surface. Such a head position during usage, that is, where the head is positioned over a spinning disk, is defined by balancing a lift force caused by an air bearing that spins with the disk acting upon the aerodynamically designed slider and an opposite bias force of the head suspension. As such, the slider and head "fly" over the spinning disk at precisely determined heights.

Head suspensions generally include an elongated load beam with a gimbal flexure located at a distal end of the load beam and a base plate or other mounting means as a proximal end of the load beam. According to a typical two piece head suspension construction the gimbal flexure comprises a platform or tongue suspended by spring or gimbal arms. The slider is mounted to the tongue thereby forming a head suspension assembly. The slider includes a read/write magnetic transducer provided on the slider and the slider is aerodynamically shaped to use the air bearing generated by a spinning disk to produce a lift force. During operation of such a disk drive, the gimbal arms permit the slider to pitch and roll about a load dimple or load point of the load beam, thereby allowing the slider to follow the disk surface even as such may fluctuate.

The head slider is precisely mounted to the flexure or slider mounting tongue of a head suspension at a specific orientation so as to fly at a predetermined relationship to the plane of the disk surface. During manufacturing and assembling of the head suspension assembly, any lack of precision in forming or assembling the individual elements can contribute to a deviation in the desired relationship of the surfaces of the elements. A buildup of such deviations from tolerance limits and other parameters in the individual elements can cause a buildup of deviation from the desired relationship of the head slider to the associated disk surface in the complete head suspension assembly. The parameters of static roll attitude and static pitch attitude in the head suspension assembly generally result from these inherent manufacturing and assembly tolerance buildups.

Ideally, for optimum operation of the disk drive as a whole, during assembly of the head slider to the slider mounting tongue, the plane of the load beam mounting surface datum and the plane of a head slider surface datum should be in a predetermined relationship to each other. The load beam mounting surface datum and the slider surface datum are usually planar surfaces that are used as reference points or surfaces in establishing the relationship of the plane of the actuator mounting surface and the plane of the surface of the head slider surface relative to each other. The upper and lower planar surfaces of the head slider are also manufactured according to specifications usually requiring them to be essentially or nominally parallel to each other.

Another critical performance-related criteria of a suspension is specified in terms of its resonance characteristics. In order for the head slider to be accurately positioned with respect to a desired track on the magnetic disk, the head suspension should be capable of precisely translating or transferring the motion of the positioning actuator arm to the slider. An inherent property of moving mechanical systems, however, is their tendency to bend and twist in a number of different modes when subject to movements or vibrations at certain rates known as resonant frequencies. At any such resonant frequencies that may be experienced during disk drive usage, the movement of a distal tip of the head suspension assembly, or its gain, is preferably minimized by the construction of the head suspension assembly. Any bending or twisting of a head suspension can cause the position of the head slider to deviate from its intended position with respect to the desired track, particularly at such resonant frequencies. Since the disks and head suspension assemblies are driven at high rates of speed in high performance disk drives, the resonant frequencies of a head suspension should be as high as possible. Resonance characteristics are usually controlled by precision construction, design and manufacture of the load beam. Accordingly, any changes or deformation to a head suspension after it is constructed, such as may be done for adjusting the static attitude of a head suspension assembly component may adversely affect the resonant characteristics of the head suspension assembly. Prior art static attitude adjusting techniques, such as described in U.S. Pat. Nos. 5,832,764 and 5,682,780, suffer from this disadvantage in that they teach modifying the shape or bending head suspension components in ways that adversely affect resonant characteristics. For example, U.S. Pat. No. 5,832,764 teaches modifying the spring region of the load beam (which region creates the bias force) that is found to be critical in controlling resonant characteristics.

Static attitude angles of a head suspension are commonly measured while the head suspension or head suspension assembly is clamped or fixtured in a loaded state so as to simulate its flying position. That is, a loaded state is created with the base plate rigidly secured and the load beam loaded (urged against its bias force), usually by a pin near its center, to be positioned at its intended fly height. Generally, such loading is performed on the load beam because it is very difficult to directly load a slider mounting tongue or a mounted slider thereto without affecting its static attitude angles. However, loading of the load beam itself is also difficult because of the clamping and fixturing that is needed. Such load beam loading can also introduce an angular bias because the loading force is not applied at the slider mounting tongue or slider. Additionally, non-centered loading of the load beam may further introduce an angular bias.

In practice, several optical methods may be used to measure the angle of component surfaces, such as laser triangulation of interferometry. Another such optical method is known as autocollimation. An autocollimator is able to measure small surface angles with very high sensitivity. Light is passed through a lens where it is collimated prior to exiting the instrument. The collimated light is then directed toward a surface, the angle of which is to be determined. After being reflected by the surface to be measured, light enters the autocollimator and is focused by the lens. Angular deviation of the surface from normal to the collimated light will cause the returned light to be laterally displaced with respect to a measurement device such as an eyepiece or a position sensing device. This lateral displacement is generally proportional to the angle of the surface and the focal length of the lens. An advantage of such a device is that the angle measurement is independent of the working distance of the lens or the distance between the instrument and the component being measured.

For some applications, white light sources are used with autocollimators. The light is directed through a pinhole to create a point source at a distance from the lens equal to the focal length of the lens. The position sensing device and the light source generally need to be at the same distance from the lens in order to obtain high resolution of the readings. Because the source and detector cannot physically occupy the same space, a beam splitter is usually utilized to mechanically offset the light source and position sensing device from one another. Typically, a 90-degree beam splitter is used.

Laser light sources are also frequently utilized for autocollimators. A main advantage is that the high intensity of the laser beam creates ultra-low noise measurements, increasing the accuracy and repeatability of the measurements. The high laser intensity also increases the working distance and permits angle measurement from non-mirror-like surfaces. Finally, the high laser intensity allows smaller spot sizes which enable measurement from small surfaces. A further advantage of a laser source is that incident white light will generally not interfere with the measurement, because the position sensing device can be chosen to be sensitive to the particular laser wavelength used. This approach typically focuses the laser to a point at a distance equal to the lens focal length in order to maintain high resolution of a position sensing diode. A disadvantage of this approach is that the surface of the lens is never perfect and some light can be reflected back onto the position sensing diode. That is, when the instrument is used to measure poorly reflective surfaces, the reflected light from the back side of the objective lens can be at approximately the same intensity as the light being reflected from the surface to be measured. As such, an accurate measurement is very difficult, if not impossible.

Additionally, in prior art devices the laser spot exits the device having the size and shape of the laser source, which can typically be greater than the workpiece surface to be measured. Thus, if the surface to be measured is generally smaller than the size and shape of the laser spot, an external mask may be needed to reduce the size of the spot on the component surface. An external mask adds mechanical positioning complexity and decreases the light in the return path, resulting in generally lower intensity of light at the detector.

Prior art equipment for determining and adjusting static attitude requires that individual suspensions be loaded into a tooling fixture for precisely aligning a component thereof to an autocollimator beam while bending the component to a desired position. This measurement takes a considerable amount of time and requires significant operator handling. It also requires that a head suspension loading mechanism, such as discussed above to simulate flying, consistently deform the head suspension component without damaging the component. Further complications include small positional misalignments between the autocollimator beam and the component to be measured. Generally, such misalignments can lead to erroneous measurements. A still further complication with common autocollimator based static attitude measurements lies with the fact that the autocollimator beam is masked very close to the measured component. The mask serves to only allow a certain desired location to be measured on the head suspension component. This masking technique can interfere with other mechanisms desired to operate in and around the component, blocks a portion of the light trying to return to the autocollimator, and obstructs the visual view of the component.

While numerous mechanisms exist to measure and adjust suspensions for static attitude, several limitations exist. A first limitation exists with those methods that act on the load beam as described above because of the possibility of introducing undesirable static attitude angle bias. Also, adjustment to the load beam can cause an undesired shift in load beam dominant resonant frequencies and gains. Additionally, equipment for acting on the load beam can be generally complex and expensive. Accordingly, there remains a continuing need for improved head suspension determining and adjustment equipment and methods. In particular, there is a need for equipment and methods for determining and adjusting head suspension and head suspension assembly static attitude.

SUMMARY OF THE INVENTION

The present invention overcomes the disadvantages and shortcomings of the prior art by providing methods and apparatuses that accurately determine and adjust the static attitude of a component of a head suspension or head suspension assembly without the need to load the load beam during measurement and to adjust the component while minimizing resonance affect. A typical head suspension to which the present invention is particularly directed includes a flexure comprising first and second gimbal arms extending from a mounting portion and connected to a slider mounting tongue, and a load beam supporting the flexure at its distal end and having a mounting region at a proximal end, a rigid region distally spaced from the mounting region, and a spring region between the mounting region and the rigid region for creating the bias force of the head suspension. A head suspension having a slider attached to the slider mounting tongue is typically referred to as a head suspension assembly.

Generally, the preferred embodiment of the present invention is an apparatus that includes a workpiece support for supporting and positioning a head suspension and an adjust device that is operatively positioned with respect to the workpiece support for adjusting the head suspension supported by the workpiece support. In an aspect of the present invention, the workpiece support comprises a demountable tray, which preferably may cooperatively engage a sub-tray or fixture of the workpiece support. In an additional aspect of the present invention, the workpiece support can movably position a head suspension or head suspension assembly supported thereon. Preferably, the sub-tray includes a surface for engaging a surface of a head suspension such as a surface of a load beam for supporting and positioning a head suspension. Such surface may also include a side element, extending from the surface, for engaging a side surface of a head suspension or head suspension assembly for improved control over the position thereof. Also, in an aspect of the present invention, the surface of the sub-tray preferably includes a vacuum port for creating a force of differential pressure to hold a head suspension against the surface of the sub-tray.

An adjust device of the preferred apparatus generally includes first and second clamp portions for restraining at least a portion of a gimbal arm of a head suspension supported by the workpiece support and an adjust body for deforming a gimbal arm while the gimbal arm is restrained by the first and second clamp portions. Preferably, the adjust device is movably supported with respect to the workpiece support. The first and second clamp portions of the adjust device each generally include an engagement element for engaging at least a portion of a gimbal arm and such engagement element may comprise a surface, edge, generally spherical boss or combinations thereof.

An adjust body of the present invention preferably includes a first adjust element for engaging with and movably deforming at least a portion of a gimbal arm in a first direction and a second adjust element for engaging with and movably deforming at least a portion of a gimbal arm in a second direction. In a preferred aspect of the present invention, the first direction and the second direction are generally opposite directions. As with the clamp portions, the first and second adjust elements each preferably include an engagement element for engaging at least a portion of a gimbal arm. Such engagement elements may comprise a surface, edge, generally spherical boss or combination thereof.

The present invention is also directed to methods of determining and adjusting the static attitude of a head suspension or a head suspension assembly. Such methods preferably include the steps of providing a head suspension or a head suspension assembly, determining the planar orientation of a surface that is indicative of the static attitude of the slider mounting tongue or a slider mounted thereto, and controllably permanently deforming a single gimbal arm of the flexure thereby adjusting the static attitude of the slider mounting tongue or the slider. In a preferred aspect of the present invention a first and second gimbal arm of the flexure are independently and separately adjusted. In a preferred aspect of the present invention, a head suspension or head suspension assembly may be operatively supported with a workpiece holder. More preferably, the workpiece holder may support the load beam of a head suspension or head suspension assembly. Preferably, the step of permanently deforming a single gimbal arm includes mechanically restraining a single gimbal arm of the flexure while mechanically bending the restrained gimbal arm.

In yet another aspect of the present invention an additional gimbal arm of the flexure may be permanently deformed after permanently deforming the first gimbal arm of the flexure thereby adjusting the static attitude of the slider mounting tongue or slider. And, in accordance with another aspect of the present invention, a first and second gimbal arm of the flexure may be simultaneously but independently controllably permanently deformed in order to adjust the static attitude of a component of a head suspension or a head suspension assembly.

With respect to measuring the planar orientation or static attitude of a surface of interest such as a surface of a slider mounting tongue or slider mounted thereto, an aspect of the present invention includes apparatuses and methods directed to such. One preferred apparatus in accordance with the present invention includes a focusing lens having a focal axis and a focal point positioned on the focal axis. Preferably, the focusing lens is positioned between the focal point of the lens and a detector operatively positioned on the focal axis of the lens. Additionally such preferred apparatus includes, a beam splitter operatively positioned on the focal axis of the focusing lens and positioned between the focusing lens and the detector, a light source directed toward the beam splitter wherein the light source can impinge upon the beam splitter and be redirected by the beam splitter to follow the focal axis of the focusing lens to the focal point of the focusing lens, and a mask having an aperture and preferably operatively positioned between the light source and the beam splitter, the mask for defining the size and shape of the light source. Accordingly, the focal point of the lens of such a apparatus can be positioned on a surface to determine the planar orientation of the surface.

An additional preferred aspect of the present invention includes a focusing lens having a focal axis and a focal point positioned on the focal axis wherein the focusing lens is positioned between the focal point of the lens and a detector operatively positioned on the focal axis of the lens as above. Further such preferred apparatus can include a beam splitter preferably operatively positioned on the focal axis of the focusing lens and positioned between the focusing lens and the focal point of the focusing lens, a light source directed toward the beam splitter wherein the light source can impinge upon the beam splitter and be redirected by the beam splitter to follow the focal axis of the focusing lens to the focal point of the focusing lens, and may additionally include a mask having an aperture preferably operatively positioned between the light source and the beam splitter and that can define the size and shape of the light source. As above, the focal point of the lens of such an apparatus can be positioned on a surface to determine the planar orientation of the surface.

Additional aspects of a measurement device in accordance with the present invention may include using a charge-coupled device as a detector and a laser as a light source. Also, an imaging lens and/or an absorptive filter operatively positioned generally on the focal axis of the focusing lens and positioned between the detector and the focusing lens may be utilized with the above described apparatus. And, in another aspect of the present invention the above described aperture mask may be movably mounted for positioning the aperture of the mask for controllably adjusting the position of the light source with respect to a surface to be measured.

These and other features and advantages of the present invention will be apparent in the following detailed description of the preferred embodiments when read in conjunction with the accompanying drawings, in which like reference numerals are used to identify the same or similar parts in the several views.

BRIEF DESCRIPTION OF THE DRAWINGS

The accompanying drawings, which are incorporated in and constitute a part of this application, illustrate several aspects of the invention and together with description of the embodiments serve to explain the principles of the invention. A brief description of the drawings is as follows.

DETAILED DESCRIPTION

The embodiments of the present invention described below are not intended to be exhaustive or to limit the invention to the particular embodiments disclosed in the following detailed description. Rather, the embodiments are described so that others skilled in the art can understand the principles and practices of the present invention.

Dynamic data storage devices, such as magnetic or optical storage drives are well known in the industry as such may include rigid or floppy disks. Rigid magnetic drives, for example, use a rigid disc coated with a magnetizable medium for storage of digital information in a plurality of circular, concentric data tracks. The disc is usually mounted on a motorized spindle which spins the disc and causes the top and bottom surfaces of the disc to pass under respective head or read/write heads. A typical head includes a hydrodynamic or air bearing slider and a transducer for writing information to and/or reading information from the disc surface. An actuator mechanism moves the heads from track to track across the surfaces of the disc under control of electronic circuitry. The actuator mechanism includes an arm and a head suspension assembly for each head.

Figure 1:
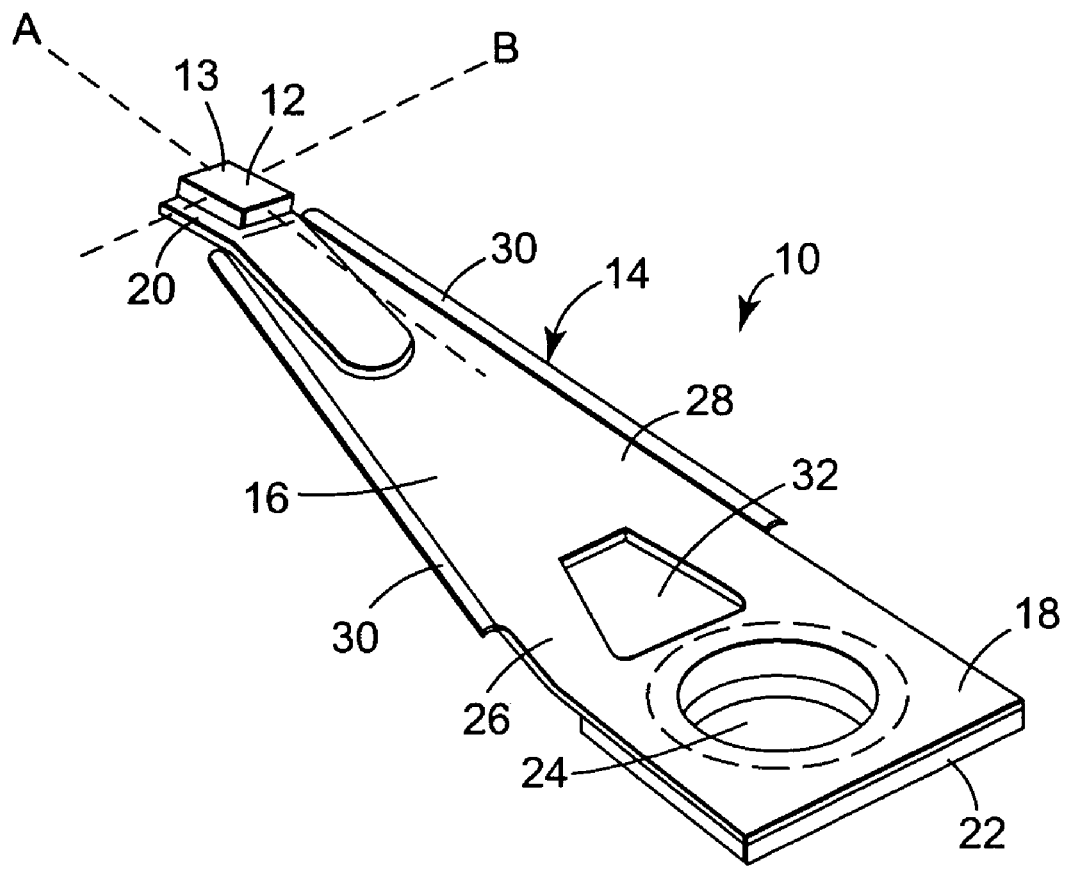
FIG. 1 is a perspective view of a head suspension assembly to while the present invention is applicable, the head suspension assembly comprising a baseplate, a load beam, a flexure, and a slider mounted to the flexure at a distal end thereof.

Head suspension assemblies, also sometimes known as head gimbal assemblies, are commonly used in rigid disk drives to support the heads in close proximity to the rotating disk surfaces. Typically, such assemblies provide a preload bias that forces the read/write heads toward the disk surfaces. One such head suspension assembly 10 is illustrated in FIG. 1. As shown, head suspension assembly 10 includes a head slider 12 mounted to a head suspension 14. The head suspension 14 includes a load beam 16 having a mounting region 18 on its proximal end and a gimbal or flexure 20 on its distal end. When incorporated into a disk drive, the mounting region 18 can be mounted to an actuator or positioning arm (not shown) which supports the head suspension assembly 10 over the rotating disk. A baseplate 22, which usually includes a mounting hole 24, is typically swaged or welded to the mounting region 18 to increase the rigidity of the mounting region and to provide a mechanism for securely mounting the head suspension assembly 10 to the positioning arm. The load beam 16 is an elongated and often generally triangularly-shaped member which includes a spring section 26 adjacent to the mounting region 18 for creating the preload bias, and a rigid section 28 which extends from the spring section. Typically, the rigid section 18 includes stiffening features 30, such as rails, that extend along at least a portion of the sides of the rigid section 18 for transferring the preload bias to the flexure 20 and thus slider 12. The spring section 26 of the head suspension assembly 10 shown in FIG. 1 includes a central opening 32 which forms the spring section 26 into two legs as shown. In this embodiment the flexure 20 is manufactured as a separate member, and attached to the distal end of the rigid region 28 by welding or other suitable technique. However, the flexure may be formed integrally with the distal end of the rigid region 28 of the load beam 16 as are well known. The head slider 12 generally contains a head (not shown), has an air bearing surface 13, and is typically bonded to the flexure 20 by adhesive or the like.

Figure 2:
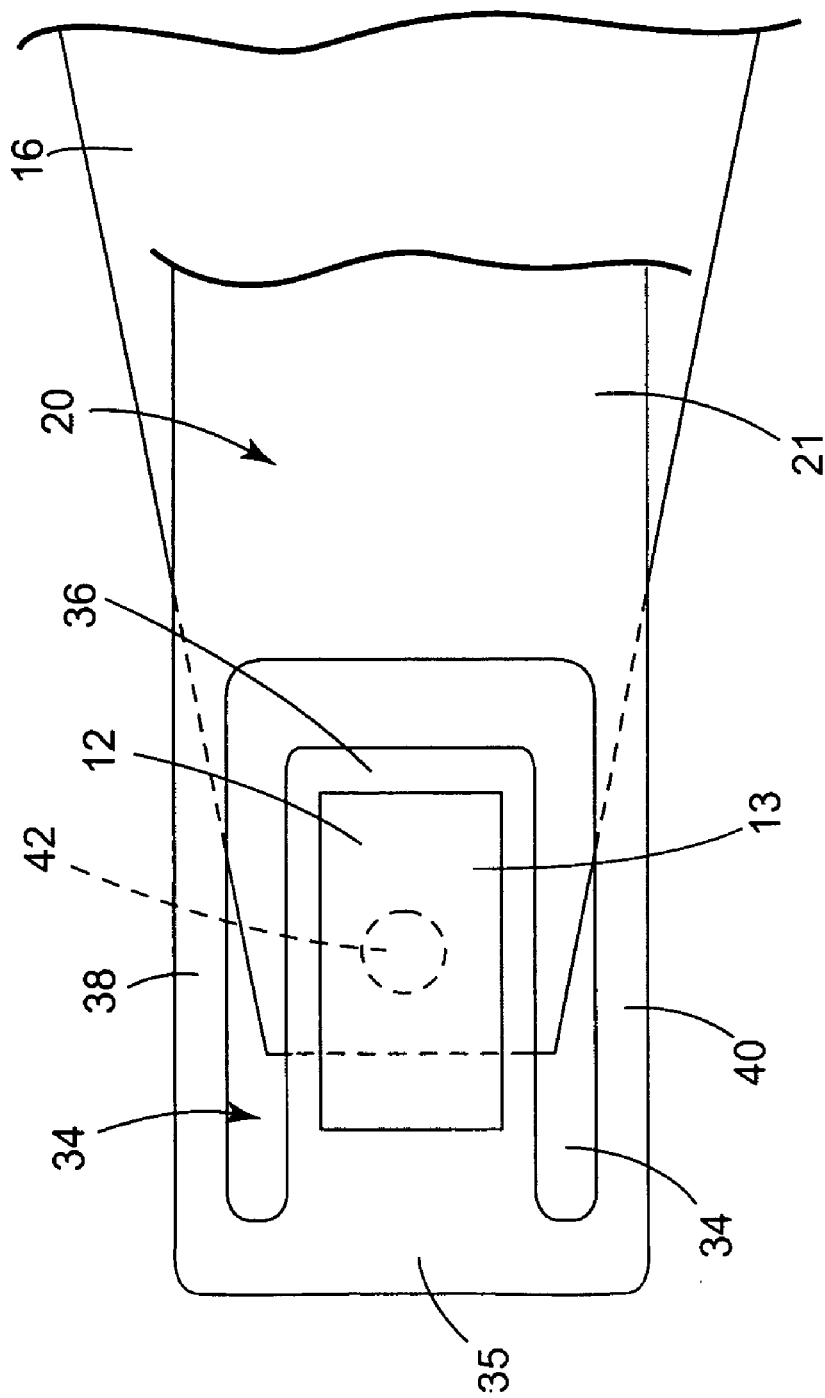
FIG. 2 is a top view of a gimbal region of a flexure that can be used in a head suspension and showing in particular a pair of gimbal arms connected to a slider mounting tongue having a slider mounted thereto.

In FIG. 2, a partial top view of the distal end of the head suspension assembly 10 of FIG. 1 is shown. As described above, a mounting portion 21 of the flexure 20 is attached to the distal end of the load beam 16 by welding or other suitable technique. As such other portions of the flexure 20 extending from the mounting portion 21 can generally flex away from the load beam 16. The flexure 20 has a cutout 34, which in the illustrated embodiment is generally U-shaped and that forms a slider mounting tongue 36 for mounting the slider 12 thereon. The cutout 34 also forms a first gimbal arm 38 and a second gimbal arm 40 that are each attached to the slider mounting tongue 36 by a crossbar portion 35 and each of which extend distally from the mounting portion 21. The load beam 16 typically also has a load point dimple 42 that engages with a back surface of the slider mounting tongue 36, the function of which is described below with respect to FIG. 4. Alternatively, such a load point dimple 42 could extend from the slider mounting tongue 36 to engage a distal portion of the load beam 16.

Figure 3:
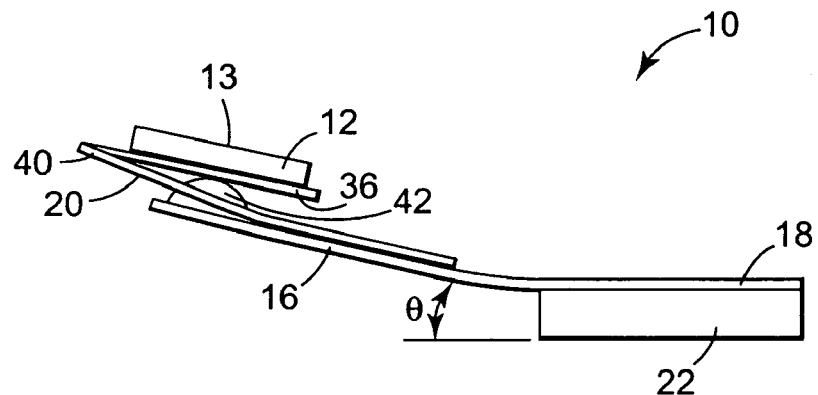
FIG. 3 is a side view of a head suspension assembly shown in an unloaded state wherein a rigid region of the loadbeam is at an angle Θ with respect to the baseplate as defined by a spring region of the loadbeam.

In FIG. 3, the head suspension assembly 10 is schematically shown in an unloaded state. Generally, in the unloaded state the back surface of the tongue 36 rests against the apex of the spherical load point button 42 under the spring action of the gimbal arms 38 and 40, which spring action is caused by their flexing caused by the height of the load point dimple 42. As can be seen in FIG. 3, the rigid section 16 of load beam 16 is at an angle θ relative to the baseplate 22. The bend comprising by the spray region 26 provides a preload bias to urge the slider toward the disk in operation. In the unloaded state of the head suspension assembly 10 as shown in FIG. 3, no preload is present since the head suspension assembly is not flexed from its unloaded state (i.e. is not loaded). Generally, as the load beam 16 is forced in a direction such that the angle θ is reduced, a preload bias is generated acting in the opposite direction.

Figure 4:
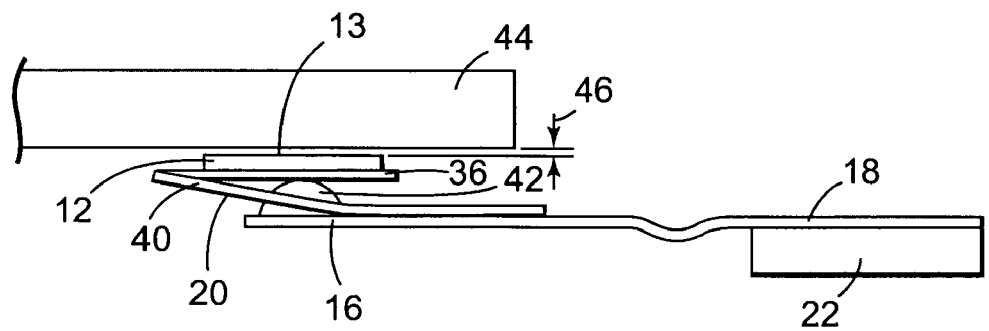
FIG. 4 is a partial side view of a head suspension assembly shown in combination with a disk of a dynamic storage device and showing in particular the slider of the head suspension assembly flying with respect to the disk in the typical operating position and with the head suspension assembly in a loaded state.

Referring to FIG. 4, the head suspension assembly 10 is shown in use with a rotating hard disk 44. As mentioned above, the head suspension assembly 10 provides a preload bias to the slider 12 to urge the slider 12 toward a surface of the disk 44. As the disc 44 rotates, the disc 44 drags air under the slider 12 along the air bearing surface 13 in a direction approximately parallel to the tangential velocity of the disc 44. As the air passes beneath the slider 12, friction on the aerodynamically designed air bearing surface 13 causes the air pressure between the disc 44 and the air bearing surface 13 to increase, which creates a hydrodynamic lifting force that causes the slider 12 to lift and fly above the surface of the disc 44. The preload bias supplied by the spring region 26 of the load beam 16 counteracts the hydrodynamic lifting force. The preload bias and the hydrodynamic lifting force reach equilibrium based upon the hydrodynamic properties of the slider 12 and the speed of rotation of the disc 44. The preload bias is transferred from the load beam 16 to the slider 12 through the load point dimple 42, which is typically a stamped feature on the load beam 16 (or the gimbal 20) having an apex that contacts the under surface of the tongue 36 where the dimple 42 is formed on the load beam 16. Accordingly, the load point dimple 42 provides a point about which the slider 12 can pitch and roll and it limits vertical displacement of the slider 12 and flexure 20 in a direction away from the disc surface. The rotation of the disk 44 causes the slider 12 to be positioned a distance 46 from the surface of the disk 44. The distance 46 is referred to as the slider "flying height" and represents the position that the slider 12 occupies when the disk 44 is rotating during normal operation. If the flying height 46 is not maintained within a certain range, the quality of the data read from the disk 44 (or written on the disk 44) generally degrades.

Figure 5:
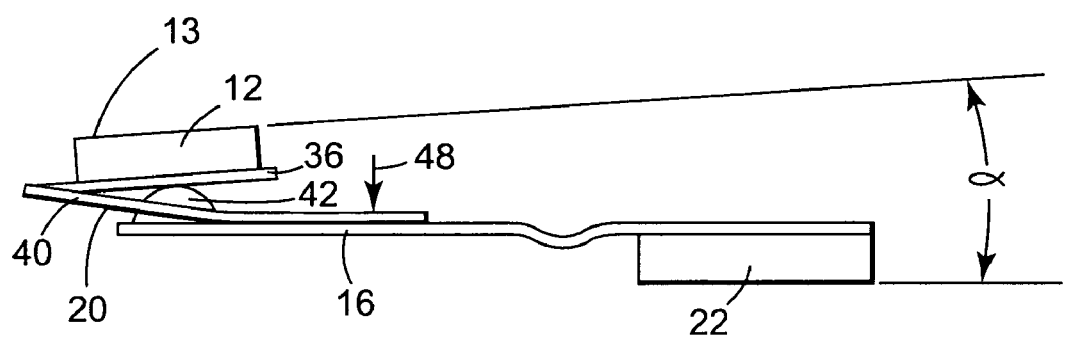
FIG. 5 is a side view of a head suspension assembly shown in a loaded state and illustrating the pitch static attitude of the slider of the head suspension assembly.

In FIG. 5, the load beam 16 is schematically shown held in a loaded state by an external means such as a force indicted generally by arrow 48. Here, the angle θ is reduced from the unloaded state and the preload bias acts in the direction opposite that of arrow 48. In this configuration, the air bearing surface 13 and the bottom surface of the baseplate 22 define an angle α. It is understood that the angle α may also be referenced from a surface of the flexure 20 such as a surface of the slider mounting tongue 36 or from any other datum chosen along the head suspension. The angle α is referred to as the pitch static attitude and generally defines a pitch aspect of the planar orientation of a surface of the slider 12 as taken about the pitch axis B shown in FIG. 1 defined by the load point dimple 42.

Figure 6:
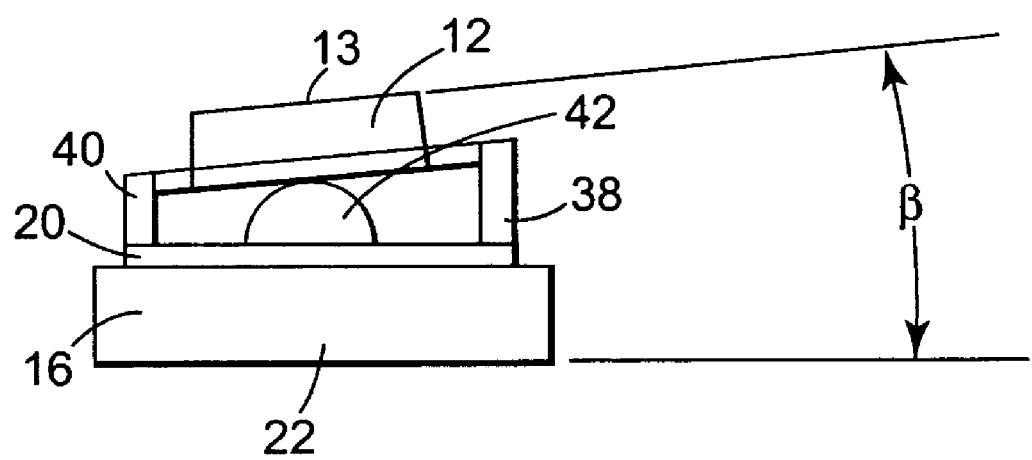
FIG. 6 is a side view of a head suspension assembly shown in a loaded state and illustrating the roll static attitude of the slider of the head suspension assembly.

Shown in FIG. 6, is a schematic end view of the head suspension assembly 10 of FIG. 5 with the load beam 16 held in the loaded state as was described with respect to FIG. 5. An angle β is defined by the horizontal tilt of the air bearing surface 13 relative to the bottom surface of the baseplate 22 as is illustrated in FIG. 6. It is understood that this angle β may also be referenced from a surface of the flexure 20 such as a surface of the slider mounting tongue 36 or the like. The angle β is referred to as the roll static attitude and generally defines a roll aspect of the planar orientation of a surface as taken about the roll axis A shown in FIG. 1 defined by load point dimple 42.

The present invention is generally directed to apparatus and methods for determining and adjusting the static attitude of a head suspension, a head suspension assembly, or for similarly processing similar components. In particular, the present invention is useful for determining the pitch static attitude and the roll static attitude (the static attitude) in order to adjust the same. Typically, static attitude is determined with a head suspension or head suspension assembly clamped or fixtured in the loaded state as shown in FIG. 5. However, the inventive apparatus and methods of the present invention can advantageously determine and adjust the static attitude while a head suspension or a head suspension assembly is in the unloaded state as illustrated in FIG. 3. Such may be accomplished, in one aspect of the present invention, by determining the planar orientation of a surface that is indicative of the static attitude of a slider mounting tongue or a slider (i.e. by detecting the static attitude of a surface of the slider mounting tongue or a slider surface) and by additionally determining the planar orientation of a reference surface such as a surface of a load beam. In an aspect of the present invention, empirically determined information as obtained by experimentally loading similar head suspension can be utilized as part of this process, in particular, for correlating loaded head suspension characteristics with unloaded head suspension determined planar orientations. For example, as is described in greater detail below, with respect to one preferred static attitude adjustment method, the static attitude of a slider mounting tongue or a slider may be determined and the planar orientation of a reference surface such as a surface of a load beam may be determined for an unloaded head suspension, and from which information, loaded static attitude can be determined based upon the correlation with the empirically determined loaded head suspension data. Thus, by the combination of the static attitude and reference planar orientations of an unloaded head suspension, the loaded static attitude can be reliably predicted from the compilation information obtained from loading similar head suspension. The static attitude of a slider mounting tongue or a slider and the planar orientation of a reference surface may then preferably be used to determine an adjustment parameter, such as a direction and magnitude, for bending a gimbal arm of a head suspension or a head suspension assembly and thereby controllably adjusting the static attitude in accordance with the present invention. As such, the static attitude of a slider mounting tongue or a slider to be adjusted may be determined and the above-described adjustment may be performed and the static attitude remeasured until a desired static attitude is accomplished. Such is generally advantageous for at least the reasons that angular bias due to loading of the load beam and non-centered loading of the load beam may be eliminated, the corresponding equipment and fixturing may be simplified, and accuracy and repeatability of the resulting adjustment may be generally improved.

Figure 7:
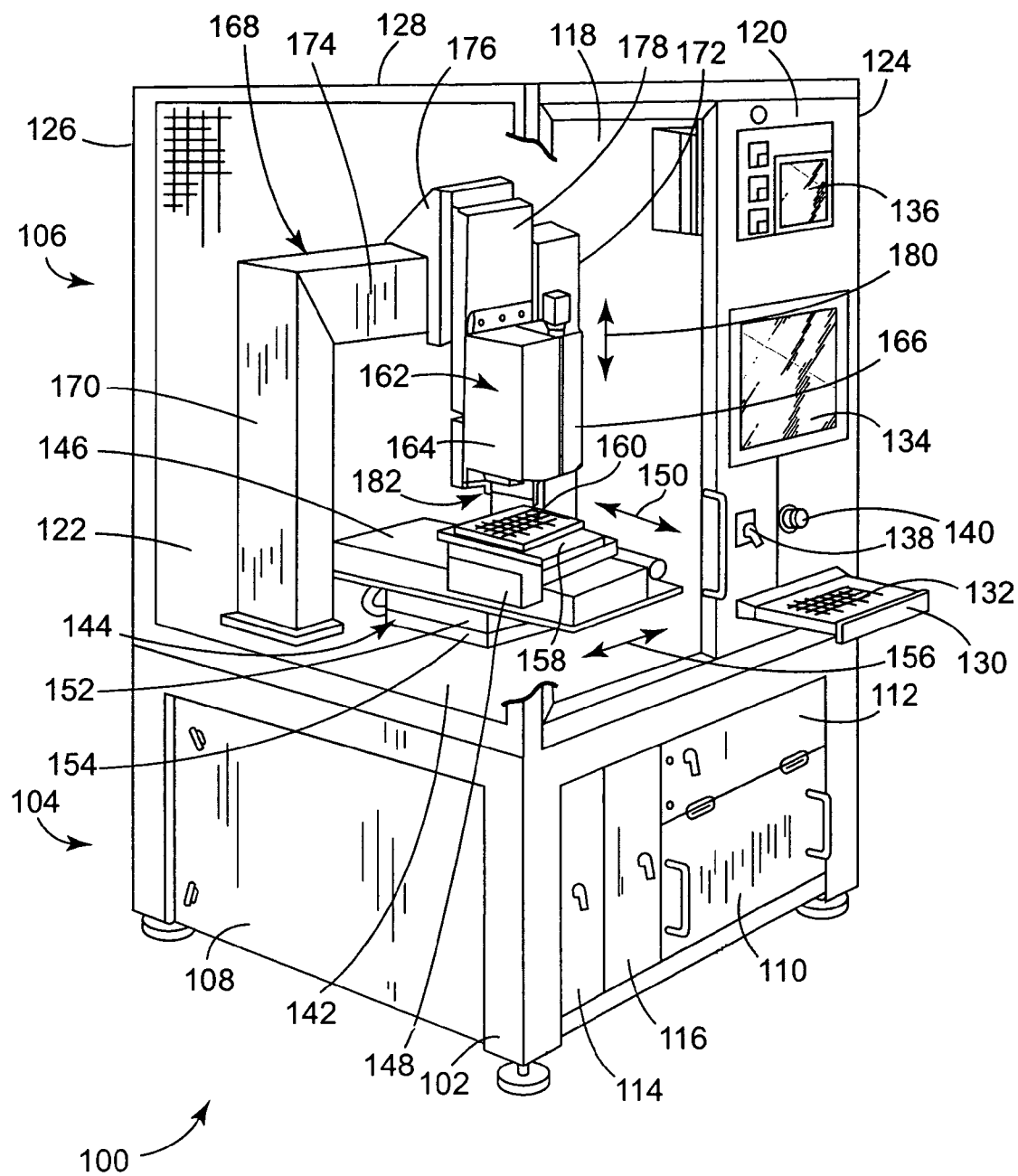
FIG. 7 is a perspective view of an apparatus in accordance with the present invention for determining and adjusting the static attitude of a head suspension or a head suspension assembly showing in particular a tool head having a measurement probe and an adjust head assembly positioned above a movable stage.

Referring now to FIG. 7, an apparatus for determining and adjusting the static attitude of a head suspension or a head suspension assembly is shown and identified generally by reference numeral 100. Preferably, the apparatus 100 includes a support frame 102 having a lower section 104 and an upper section 106 which may be constructed in any conventional or developed way. As shown in FIG. 7, the lower section 104 of the support frame 102 may include a removable side panel 108 for accessing the internal space of the lower section 104. Typically, electronic equipment, wiring and cabling, as well as pneumatic lines and components may be located within the internal space of the lower section 104 of the support frame 102. For example, the lower section 104 of the support frame 102 may provide mounting and support for electronic equipment such as a motion axis controller 110, and a computer (not shown), which computer is preferably used as a general control computer for the apparatus 100. In the illustrated embodiment, the computer is operatively supported behind an access door 112 of the lower section 104 of the support frame 102. Additionally, removable panels 114 and 116 may be included as illustrated for accessing the internal space of the lower section 104 of the support frame 102.

Further referring to FIG. 7, the upper section 106 of the support frame 102 preferably includes a main access door 118 and a secondary access door 120, which doors generally comprise a front side of the apparatus 100. Additionally, the upper section 106 of the support frame 102 preferably includes a left wall 122, right wall 124, rear wall 126, and a top wall 128 as shown in FIG. 7, which generally form and enclose the upper section 106. Preferably, the main access door 118, left wall 122, right wall 124, rear wall 126, and top wall 128, comprise a mesh or vented structure as shown in illustrated in FIG. 7 for allowing air flow through the upper section 106 of the support frame 102. Such is preferred for general clean room compatibility. Additionally, it is preferred that the upper section 106 of the support frame 102 be generally resistant to electrostatic buildup for minimizing any undesirable electrostatic discharge that can be created by the typical air flow within a clean room environment. Accordingly, the upper section 106 of the support frame 102 is preferably formed from stainless steel or other known or developed electrostatic discharge compatible materials. However, it is noted that the above described mesh structure is not required for all applications. That is, it is understood that the main access door 118, left wall 122, right wall 124, rear wall 126, and/or top wall 128 may comprise solid panels for certain applications or may be omitted altogether.

Again with reference to FIG. 7, the secondary door 120 preferably includes a keyboard tray 130, for holding a keyboard 132, and a flat screen 134. Preferably, the keyboard 132 and the flat screen 134 are connected to the computer that is located behind the access panel 112. Also, as can be seen in FIG. 7, the secondary door 120 preferably includes a monitor 136 for connection to a process vision camera, which camera is described in detail below. The secondary door 120, also preferably includes a power switch 138 and an emergency off button 140 as illustrated, and as are well known in such equipment.

The lower section 104 and the upper section 106 of the frame structure 102 are preferably separated by a mounting platform 142 that is supported by the frame structure 102. Generally, the mounting platform 142 may be rigidly supported by the frame structure 102. It is understood however, that the mounting platform 142 may include vibration isolation features. That is, the mounting platform 142 may be attached to the frame structure 102 via vibration isolation devices or may comprise an air table or the like.

Preferably, as illustrated in FIG. 7, a movable stage 144 is operatively mounted to the platform 142. The movable stage 144 of the illustrated embodiment preferably includes two axes of motion. Firstly, the movable stage 144 includes a base 146 and carriage 148, which carriage 148 may slidably move with respect to the base 146 in a generally front to back direction as generally indicated by Arrow 150. Secondly, the base 146 is preferably mounted to a carriage 152, which carriage 152 may slidably move with respect to a base 154, which base 154 is preferably attached to the mounting platform 142. As illustrated, the carriage 152 may slidably move with respect to the base 154 in a generally left to right direction as generally indicated by Arrow 156. The moveable stage 144 can comprise any conventional or developed single or multi-axis movement mechanism, such as any commercially available linear or x-y type mechanism.

The carriage 148 preferably includes a sub tray 158 which may engage and function cooperatively with a tray 160. As described in detail below with respect to FIGS. 8, 9, and 10, the tray 160 preferably holds components such as head suspensions or head suspension assemblies, which may be processed by the apparatus 100 as described hereinafter.

The apparatus 100 for determining and adjusting the static attitude of a surface of a head suspension or head suspension assembly that is shown in FIG. 7 preferably includes a tool head 162. As shown, the tool head 162 preferably includes covers 164 and 166 that fit together to enclose and protect components of the tool head 162. Preferably, the tool head 162 is supported by a support structure 168. In the embodiment illustrated in FIG. 7, the support structure 168 comprises a first vertical support member 170, a second vertical support member 172, and a horizontal support member or beam 174. Preferably, the vertical support member 170 and 172 are mounted to the mounting platform 142 and the horizontal beam 174 is supported by the vertical support members 170 and 172 as shown. Additionally, the support structure 168 preferably includes a right angle mounting plate 176 and a movable stage 178. As can be seen in FIG. 7, the right angle mounting plate 176 is attached to the horizontal beam 174, the movable stage 178 is attached to the right angle mounting plate 176, and preferably, the tool head 162 is attached to the movable stage 178 thereby supporting and positioning the tool head 162 above the movable stage 144. Preferably, the movable stage 178 includes the capability to move in a generally up and down direction with respect to the movable stage 144 and as generally indicated by Arrow 180. The moveable stage may comprise any conventional or developed linear or multi-axis movement mechanism as well.

Further referring to FIG. 7, the tool head 162 includes a working region generally indicated by reference numeral 182. The working region 182 of the tool head 162 may be positioned with respect to a component such as a head suspension or a head suspension assembly supported and positioned by the sub-tray 158 and tray 160 by the cooperative motion of the movable stage 144 and the movable stage 178. That is, the movable stage 144 may move in a direction from front to back as illustrated by Arrow 150 and also in a direction from left to right as indicated by Arrow 156 for positioning a component supported thereon with respect to the working region 182 of the tool head. Further, movable stage 178 may move the working region 182 in an up and down direction with respect to a component supported and positioned by the sub-tray 158 and the tray 160 and as indicated by Arrow 180. It is understood, that positioning of the working region 182 with respect to a component to be processed may be achieved in any manner such that the functional aspects of the present invention or accomplished. For example, the tool head 162 may be generally non-movable or fixed and the movable stage 144 may include the capability to move in the up and down direction indicated by Arrow 180. Also, the tool head 162 may include the capability to move in the left to right direction indicated by Arrow 156 and/or may include the capability to move in the front to back direction indicated by Arrow 150. That is, the capability of the working region 182 of the tool head 162 to be movably positioned with respect to a component to be processed is not limited to the exemplary embodiment described above and illustrated in FIG. 7. It is also contemplated that less than three axis total movement may be sufficient depending on the particular application.

Components such as head suspensions and head suspension assemblies are preferably presented to the working region 182 of the tool head 162 by the cooperative functioning of a sub-tray 186 and a tray 184. The tray 184 is illustrated generally in FIG. 8 and is also the subject of currently co-pending and co-assigned U.S. patent application Ser. No. 09/409,010, filed Sep. 29, 1999, and entitled "Processing Tray," the entire disclosure of which is incorporated fully within the application by reference. Referring to FIG. 9, a portion of a preferred tray 184 is illustrated together with a portion of a preferred sub-tray 186 and is described in further detail below. Preferably, the tray 184 is capable of delivering a plurality of components to the apparatus 100 for processing thereof as described hereinafter.

Figure 8:
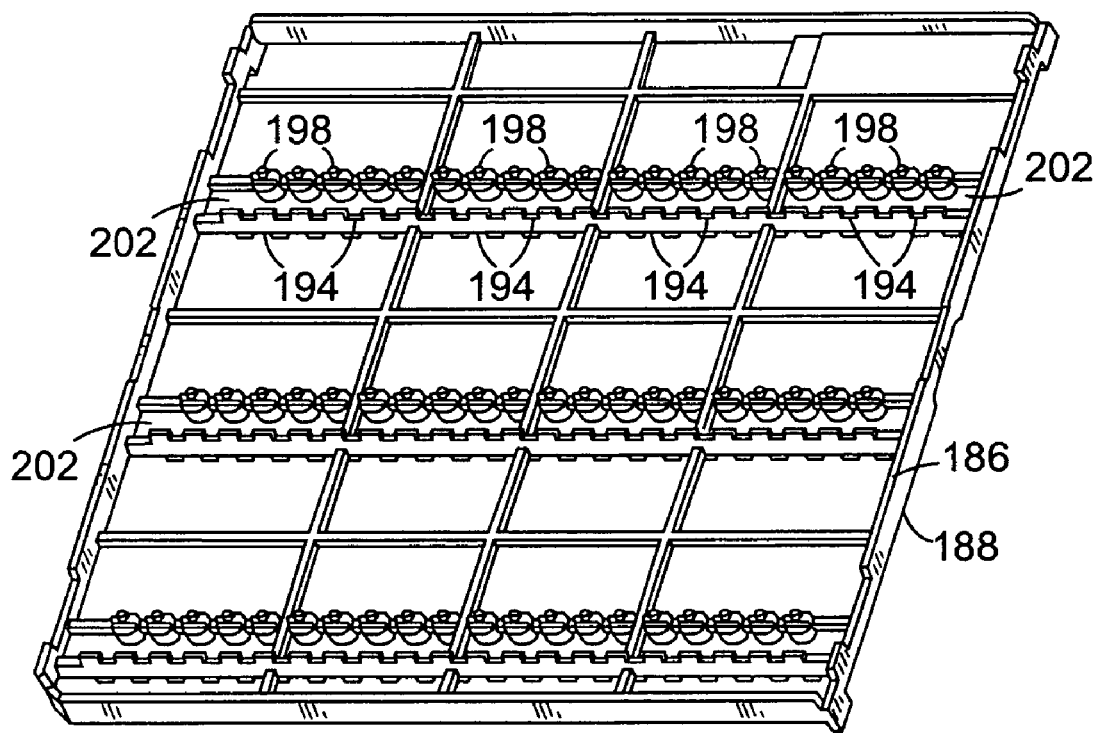
FIG. 8 is a perspective view of a tray for supporting and positioning a plurality of head suspensions or head suspension assemblies usable with the apparatus illustrated in FIG. 7.
Figure 9:
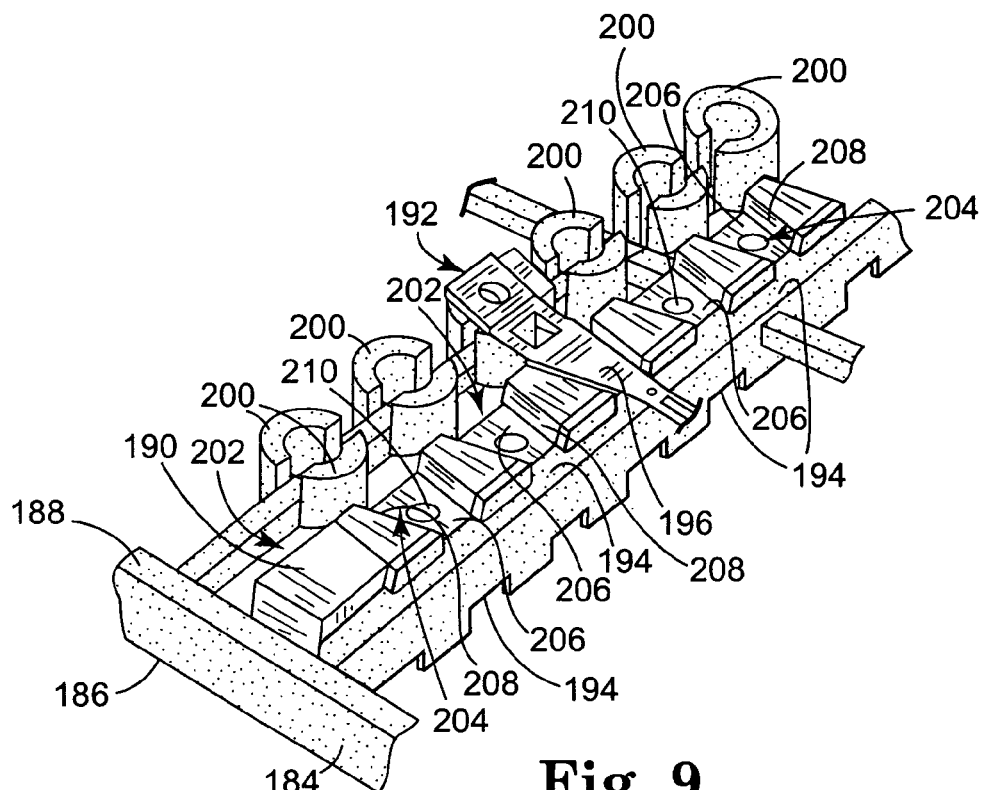
FIG. 9 is a perspective view of a portion of the tray shown in FIG. 8 and showing in particular a sub-tray for engaging the load beam of a head suspension or a head suspension assembly while being processed by the apparatus shown in FIG. 7.

Referring to FIG. 8, the tray 184 generally includes first and second opposite sides 186 and 188 respectively for holding and positioning head suspensions, head suspension assemblies, or other similar components. Preferably, the first side 186 of the tray 184 can present a head suspension assembly to the working region 182 of the tool head 162 with the slider facing down while the second side 188 may present the slider facing up. Accordingly, a component may be advantageously presented to the working region 182 of the apparatus 100 in alternative orientations.

Figure 10:
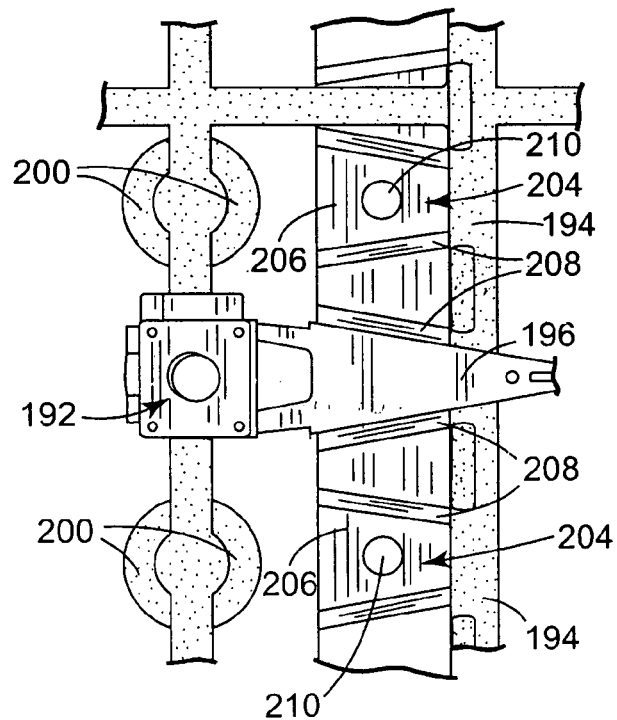
FIG. 10 is a top view of a portion of the tray and sub-tray illustrated in FIG. 9.

The preferred tray 184 is further shown in FIG. 9 in combination with an exemplary sub-tray 190 and a head suspension assembly 192 supported and positioned by the tray 184 and sub-tray 190. Additionally, a top view of the tray 184, sub-tray 190, and head suspension assembly 192 is shown in FIG. 10. Preferably, the tray 184 includes a plurality of load beam seats 194, each for supporting a load beam 196 of a head suspension or head suspension assembly such as is illustrated in FIG. 9. That is, a head suspension or a head suspension assembly may be advantageously supported and positioned in an unloaded state such as is generally illustrated in FIG. 3. Also, the tray 184 preferably includes a plurality of baseplate seats 198 positioned on the first side 186 of the tray 184 that may function together with the load beam seats 194 facing that way for supporting and positioning a head suspension or a head suspension assembly with the slider facing down (see FIG. 8, which shows tray side 186 facing up). Further, as can be seen in FIG. 9, the tray 184 also preferably includes a plurality of baseplate seats 200 positioned on the second side of the tray 188 that may function together with the load beam seats 194 for supporting and positioning a head suspension or a head suspension assembly with the slider facing up. It is understood that the tray 188 may alternatively support and position a head suspension or a head suspension assembly in differing orientations and is not limited to up and down orientations.

Further referring to FIG. 8, the preferred tray 184 includes openings 202, which openings generally allow the sub-tray 190 to access and engage at least a portion of a head suspension or head suspension assembly carried by the tray 184 as is illustrated in FIG. 9.

Such openings 202 result from preferred construction of the tray 184 wherein the seats 194 and the oppositely facing baseplate seats 198 and 200 are provided as features of crosspieces that connect between sides portions of the tray 184. Any number of other functional constructions are also contemplated. Further referring to FIGS. 9 and 10, the sub-tray 190 preferably includes engagement regions 204 for engaging with at least a portion of a load beam such as the load beam 196 of the head suspension assembly 192. Preferably, each engagement region 204 includes a support surface 206 and angularly disposed sides 208 for supporting and positioning a head suspension or head suspension assembly such as the head suspension assembly 192 illustrated in FIGS. 9 and 10. More preferably, each support surface 206 is bounded by a pair of sides 208 to engage the side edges of the head suspension or head suspension assembly to be supported thereby. Additionally, the support surface 206 preferably includes a vacuum port 210 which may be attached to a vacuum generating device (not shown) for securing a head suspension or a head suspension assembly to the support surface 206. Appropriate vacuum passages may be made integrally within the sub-tray 190 or by separate fluid connections, as are well known.

In operation, a tray and sub-tray such as the exemplary tray 184 and sub-tray 190 shown in FIGS. 8, 9, and 10 preferably function cooperatively to present either side of a head suspension or head suspension assembly to the working region 182. Preferably, a head suspension or a head suspension assembly is presented to the working region 182 in an unloaded state such as is shown in FIG. 3. Preferably, a tray holding a plurality of head suspensions or head suspension assemblies is positioned to engage the sub-tray 190 so such that the engagement regions 204 of the sub-tray 190 can pass through the openings 202 of the tray 184 as shown in FIG. 9. In a preferred embodiment, at least a portion of the load beam 196 of a head suspension or head suspension assembly 192 is supported by at least a portion of the support surface 206 of an engagement region 204 and preferably may be held against surface 206 by using the vacuum port 210 to draw a vacuum thereon. Accordingly, a plurality of head suspensions or head suspension assemblies or other similar components may be delivered to the apparatus 100 and presented to the working region 182 to be processed as described hereinafter.

It is understood, that a single head suspension or head suspension assembly or a plurality of head suspensions or head suspension assemblies may be supported and positioned with respect to the working region 182 by any means such that the functional aspects of the present invention are accomplished. A sub-tray and tray such as the sub-tray 190 and tray 184 described above may preferably be used. Also, any known or developed fixturing and support may be used alone or in combination with a tray and a sub-tray, such as by utilizing vacuum as described above or by using mechanical clamping and the like. Additionally, the present invention is not meant to be limited to supporting and positioning a head suspension, head suspension assembly, or similar component in the unloaded state illustrated in FIG. 3. It is understood, that the present invention may be utilized wherein a head suspension or head suspension assembly is supported and positioned with respect to the working region 182 in the loaded state illustrated generally in FIG. 5.

Figure 11:
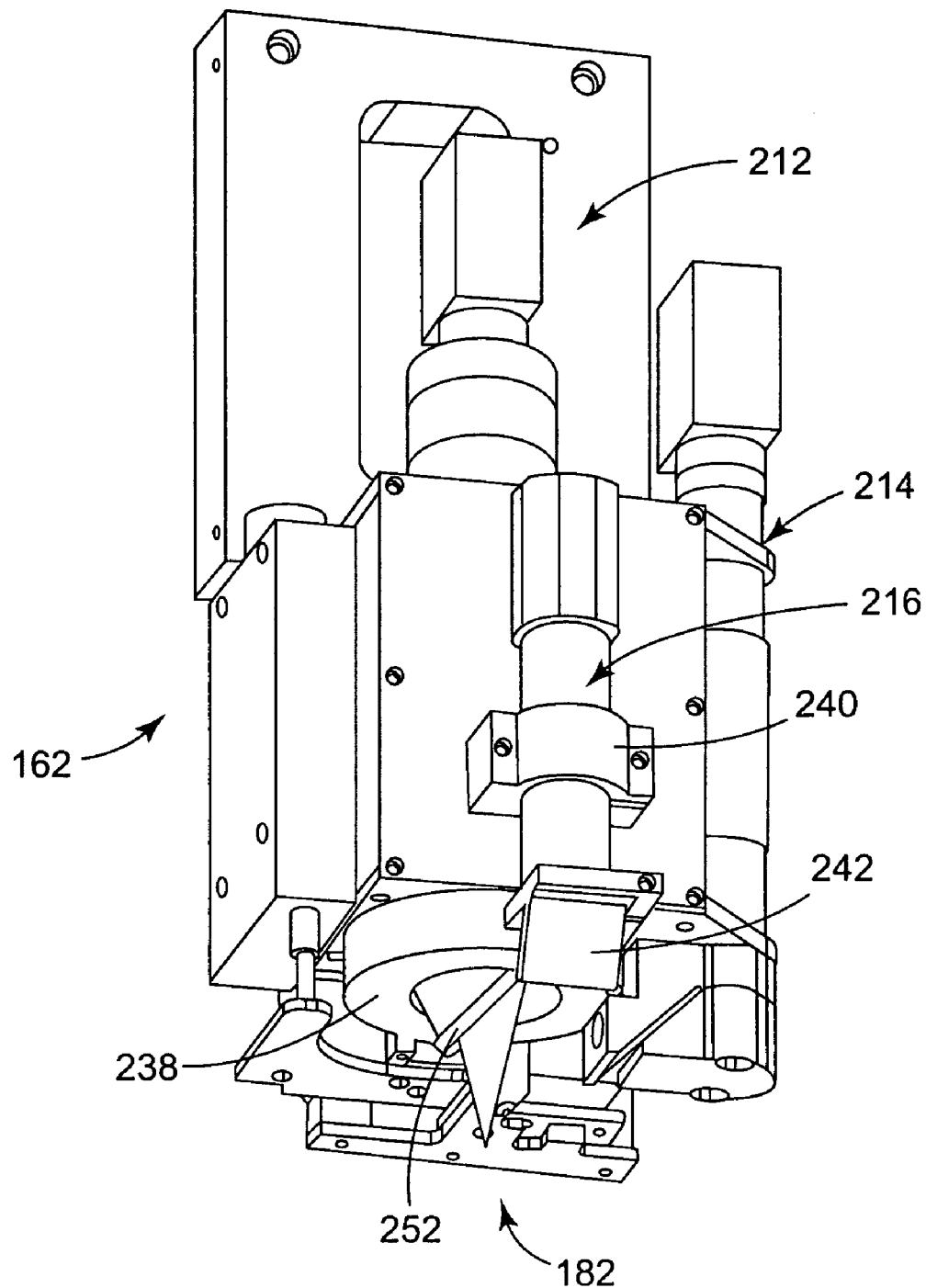
FIG. 11 is a perspective view of the tool head of the apparatus of FIG. 7 showing in particular the measurement probe, the adjust head assembly, and a process vision camera.

Now referring to FIG. 11, the tool head 162 is illustrated independently from the apparatus 100 but with the covers 164 and 166 removed. Generally, the tool head 162 preferably includes an adjust head assembly 212, a measurement probe 214, and a process vision camera 216. As can be seen in FIG. 11 the adjust head assembly 212 includes the working region 182 previously described. Both the adjust head assembly 212 and the process vision camera 216 are described in greater detail below. In particular, the adjust head assembly 212 is described in detail below with respect to FIGS. 15 and 16.

Figure 12:
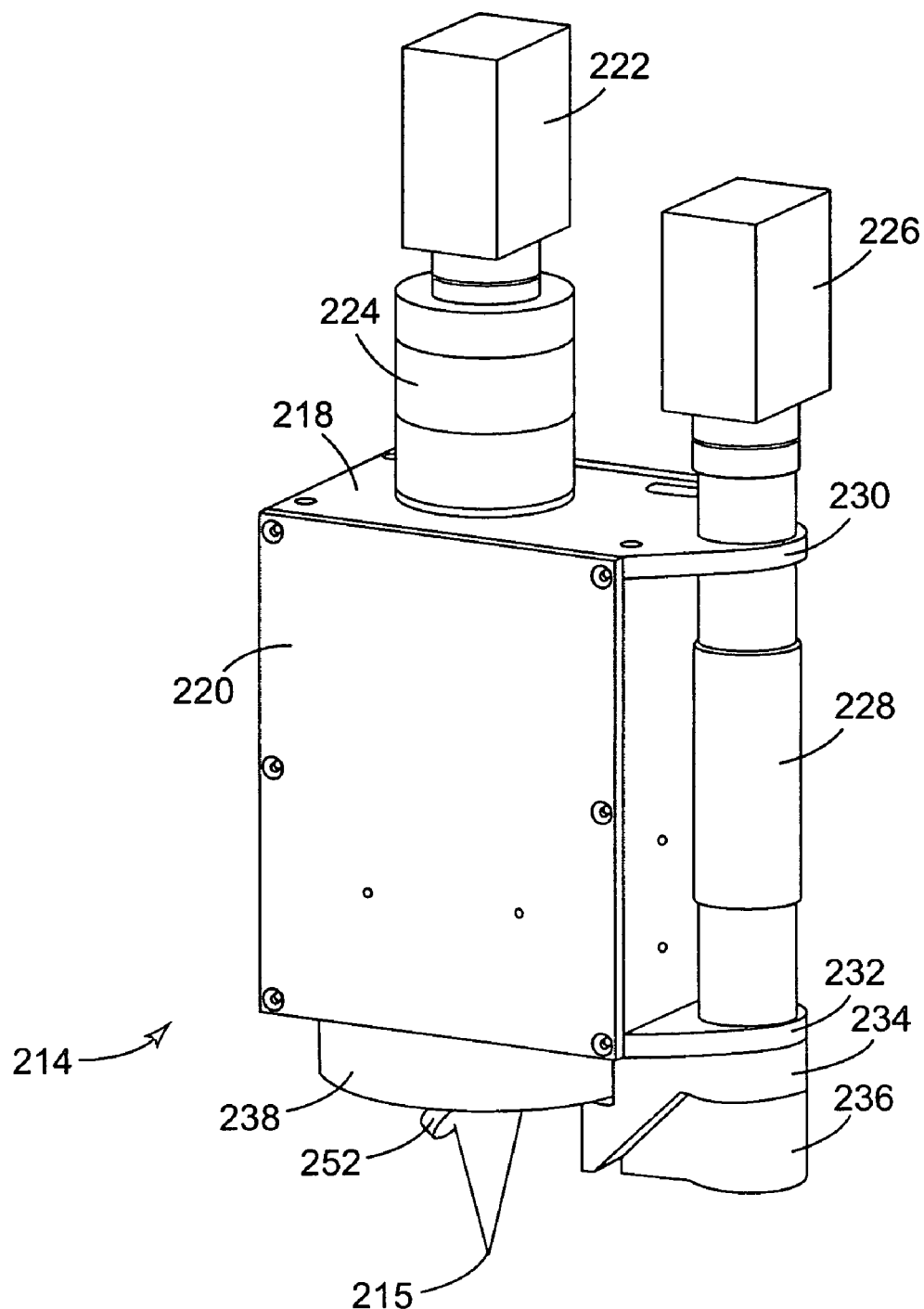
FIG. 12 is a perspective view of the measurement probe of FIG. 11 and showing in particular an enclosure, a detector, and a pattern recognition camera.

The measurement probe 214 is shown generally in FIG. 12 and removed from the tool head 162. Such a measurement probe 214 is generally useful for measuring the relative planar orientation of surfaces of a component such as the surfaces of a head suspension, head suspension assembly, or other similar component and is sometimes referred to as an autocollimator. As illustrated in FIG. 12, the measurement probe 214 generally comprises a measurement point 215 which is generally illustrated in FIG. 12 as the apex of a focused cone of light and which is discussed below. It is understood, however, as described below, that the measurement point 215 is not limited to a generally focused point of light and is illustrated as such for illustrative purposes as an exemplary embodiment.

Preferably, the measurement probe 214 comprises an enclosure 218 having a cover 220. Generally, the enclosure 218 encloses optical components, which are described below with respect to FIG. 14. Also, as shown, the measurement probe 214 includes a detector 222 and an optics enclosure 224 which are further described below with respect to FIG. 14. Also, the measurement probe 214 includes a beam splitter 252, which can be seen in FIGS. 11, 12, and 13, the function of which is described in detail below.

Further referring to FIG. 12, the measurement probe 214 also preferably includes a camera 226 and an associated optics enclosure 228 attached thereto. Generally, the camera 226 may be utilized for viewing the general region around the measurement point 215 or may be used as a pattern recognition camera as later described. As illustrated in FIG. 12, the optics enclosure 228 may be supported and positioned by a top mounting flange 230 and a bottom mounting flange 232 which can be formed as part of the enclosure 218. Also, a housing 234 for holding and positioning an optical component such as a beam splitter and a housing 236 for holding and positioning an optical component such as a mirror are attached to the enclosure 218 and are positioned operatively with respect to the camera 226, the optics enclosure 228, and the measurement point 215 as described below with respect to the preferred arrangement of optical components. Additionally, a preferred measurement probe 214 includes a light source 238 which may be used to illuminate the general region of the measurement point 215 for viewing by the camera 226. A preferred light source 238 is a light emitting diode type ring light as is best illustrated in FIG. 11. It is understood however that any suitable light source may be used in accordance with the present invention. That is, preferably the light from the light source 238 is different from the light that is measured by the detector 222 such that the detector 222 can distinguish between light from the light source 238 and light that is being used to perform a measurement with the detector 222 as described below.

Also, the process vision camera 216 illustrated in FIG. 11 may be used for providing a view of the general region around the measurement point 215. That is, the process vision camera 216 may be used to view the working region 182 in general. In a preferred embodiment, the process vision camera 216 may be used to view the general area of the working region 182 and the camera 226 may be used for pattern recognition as described below. In one embodiment, the process vision camera 216 can be mounted to the cover 220 of the enclosure 218 by using a bracket 240 as is illustrated in FIG. 11. Also, as shown in FIG. 11, the process vision camera 216 may include a mirror 242 for viewably directing the camera to the desired area to be observed such as the general area of the measurement point 215 and the working region 182.

Figure 13:
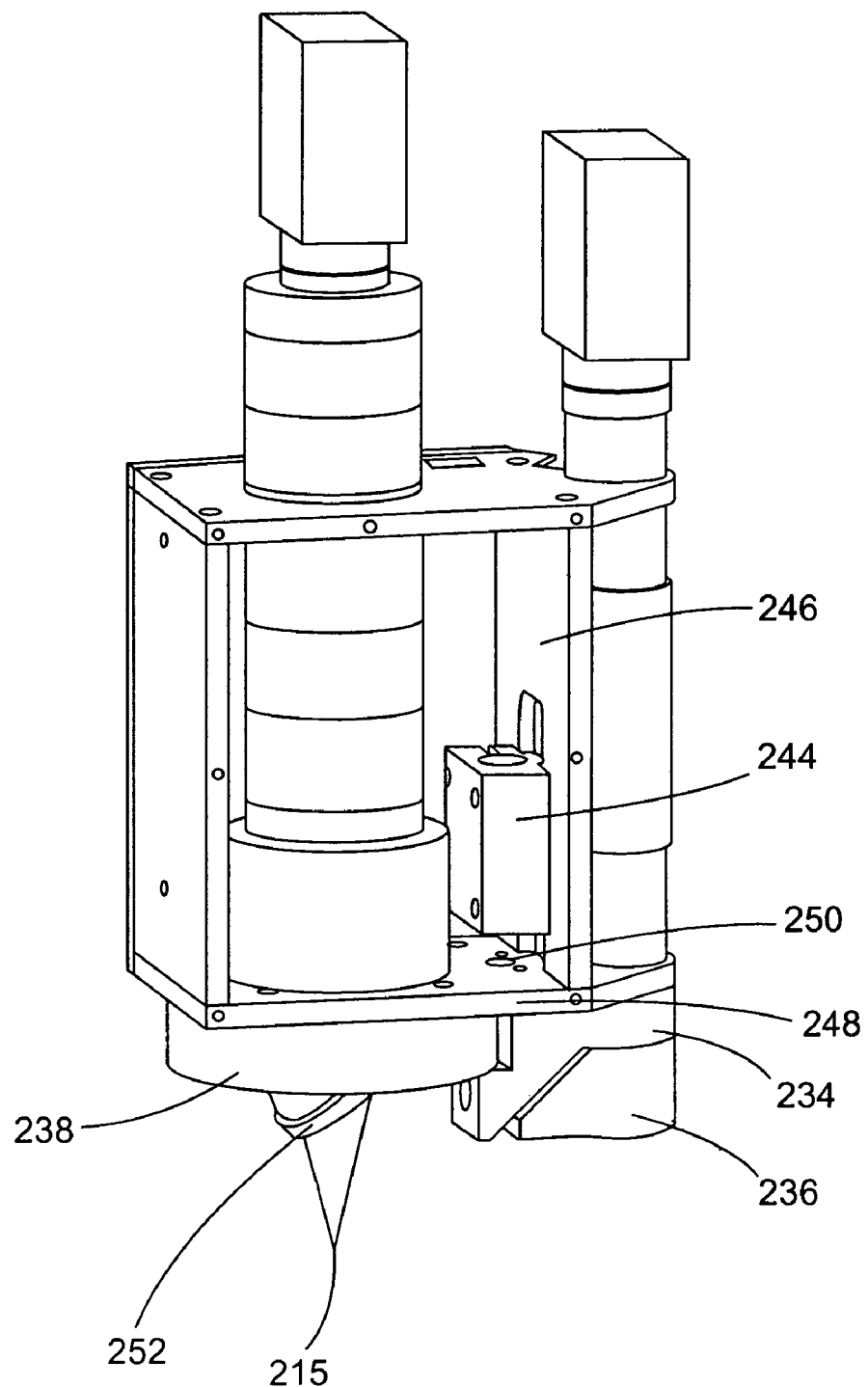
FIG. 13 is a perspective view of the measurement probe of FIG. 12 having a cover of the enclosure removed and illustrating in particular a light source within the enclosure.

In FIG. 13, the measurement probe 214 is illustrated with the cover 220 of the enclosure 218 removed. The preferred measurement probe 214 also includes a light source 244 mounted to a sidewall 246 of the enclosure 218 and operatively optically positioned as described below. Preferably, the light source 244 is a laser diode light source having a wavelength of about 670 nanometers. Preferably, a bottom side 248 of the enclosure 218 includes an aperture 250, which allows light from the light source 244 to pass through the bottom plate 248. In a preferred embodiment, the aperture 250 may be used as a mask for defining the size and shape of the light beam of the light source 244. Generally, the light beam of a typical light source, such as a laser diode light source, can have a size and shape larger than certain surfaces that are desired to be measured. As such, the size and shape of the aperture 250 can be chosen accordingly. It is understood that the size and shape of the aperture 250 as illustrated in FIG. 13 is for one specific application. An additional component may be utilized as a mask instead of the aperture 250, which passes through the bottom plate 248. That is, the aperture 250 may be used as an opening to allow light to pass through the bottom plate 248 and a mask may be used for defining the size and shape of the light beam. Such masks may be incorporated into the laser diode 244 itself or may be a separate component altogether. Additionally, a mask may be movably positionable to facilitate controllable positioning of the light beam with respect to the optical system in general. That is, a mask may be utilized to fine-tune the position of the light beam on a surface of a component to be measured. A more detailed description of the optical system including a description of a preferred mask and its advantageous features is presented below.

Figure 14:
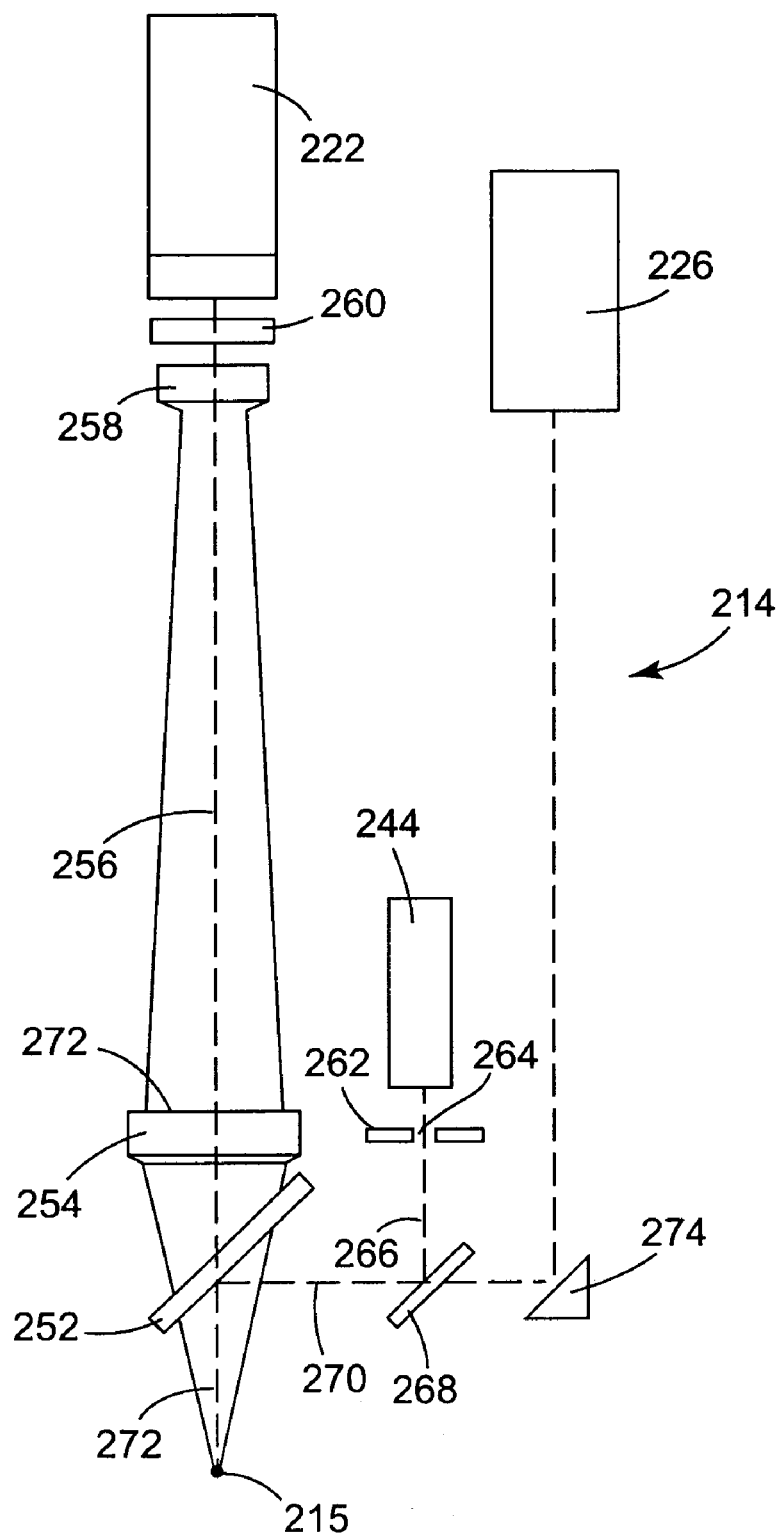
FIG. 14 is a schematic view of a measurement probe in accordance with the present invention, such as shown in FIG. 13 and showing in particular a beam splitter positioned between a measurement point and a focusing lens and an aperture mask positioned in front of the light source.

With reference to the schematic illustration of the measurement probe 214 shown in FIG. 14, the functional aspects of the measurement probe 214 will be described and discussed in detail. As can be seen in FIG. 14, the measurement probe 214 preferably includes a focusing lens 254, which lens generally includes an optical axis 256. Further, the focusing lens 254 includes a focal point, which may generally correspond with the measurement point 215. Thus, as illustrated, light may pass from the measurement point 215 through the focusing lens 254 and generally along the path of the optical axis 256 where the light may impinge upon the detector 222. In a preferred embodiment, the detector 222 is a position sensing detector and can determine, with a high degree of sensitivity, the position of a light beam impinging thereon. Such position sensing detectors themselves are known and commercially available, such as the ST50 model detector available from Sony Corp. of Japan and the like.

The measurement probe 214 also may include an imaging lens 258 for certain applications. Generally, the imaging lens 258 may be used for adjusting the range of the measurement probe 214. That is, for certain detector devices such as the detector 222 the imaging lens 258 may be used for matching the particular detector used to the size and shape of the light beam being used for the measurement. Such optical principals and practices are generally well known and understood. Preferably, when used, the imaging lens 258 is positioned between the focusing lens 254 and the detector 222 and is positioned generally and operatively on the optical axis 256.

The measurement probe 214 also preferably includes a neutral density or absorptive filter 260. As illustrated in FIG. 14, the absorptive filter 260 is preferably positioned between the imaging lens 258 (if used) and the detector 222 and generally operatively on the optical axis 256. In general, the absorptive filter 260 may be used for controlling (by generally reducing) the amount light that reaches the detector 222. Accordingly, high-intensity light may be used without flooding the detector with too much light thereby reducing its measurement sensitivity. Such high intensity light may be desirable for certain applications, especially for use with surfaces having generally low reflective characteristics.

Further referring to FIG. 14, the measurement probe 214 also preferably comprises the beam splitter 252, which is preferably positioned between the measurement point 215 and the focusing lens 254 and generally operationally on the optical axis 256. It is understood, that the beam splitter 252 may also be positioned between the focusing lens and the detector 222. As shown, the measurement probe 214 also comprises the light source 244 as previously mentioned. As can be seen in FIG. 14, light from the light source 244 can follow an optical path 266 and impinge upon a beam splitter 268, which beam splitter may be preferably mounted in the housing 234 as illustrated in FIG. 12. Additionally, the measurement probe 214 preferably includes a mask 262 having an aperture 264, which mask may be preferably positioned between the light source 244 and the beam splitter 268. Preferably, the aperture 264 of the mask 262 can be used for defining the size, shape, and position of the light source.

In operation, light from the light source 244 can exit the light source 244 and be defined in size, shape, and position by the mask 262. The light may then follow the optical path 266 where it can impinge upon the beam splitter 268 and be redirected to follow the optical path 270 to the beam splitter 252 where it may be redirected to follow the optical path 272 to the measurement point 215 which may generally be positioned on a surface to be measured such as a surface of a head suspension or a head suspension assembly. Accordingly, light can be reflected from the surface at the measurement point 215 and be directed to the detector 222 by passing through the beam splitter 252, the focusing lens 254, and any additional lenses or optics used such as the imaging lens 258 and the absorptive filter 260. Deviation of a surface to be measured from a reference plane such as a plane generally normal to the optical axis 256 will cause the reflected light to be laterally displaced with respect to the detector 222. In general such lateral displacement is proportional to the planar orientation of the surface being measured and the focal length of the focusing lens. Accordingly, the measurement is advantageously independent of the distance between the focusing lens 254 and the surface being measured.

As discussed above, the beam splitter 252 is preferably positioned between the measurement point 215 and the focusing lens 254. As such, light from the light source 244 does not pass through the focusing lens 254 before impinging on the surface to be measured. The inventive positioning of the beam splitter 252 between the measurement point 215 and the focusing lens 254 is advantageous over positioning the beam splitter 252 between the focusing lens 254 and the detector 222 for at least the reasons presented hereinafter. When the beam splitter 252 is positioned between the focusing lens 254 and the detector 222, source light that is to be directed from the beam splitter 252 to the measurement point 215 must pass through the focusing lens 254. As such, light may be reflected from the backside 272 of the focusing lens 254 to the detector 222. Such reflected light, may generally have an intensity similar to that of the light beam reflected from the surface to be measured at the measurement point 215. Such is generally undesirable because the light reflected from the backside 272 of the focusing lens 254 cannot be easily differentiated from the light beam reflected from the surface to be measured and can result in erroneous measurements.

Further referring to FIG. 14, the measurement probe 214 may include the pattern recognition camera 226 as described above. Accordingly, a mirror 274 may be preferably used to direct the view of the pattern recognition camera 226 to the general area of the measurement point 215. In the exemplary embodiment shown in FIG. 14, the mirror 274 is a right angle mirror which can direct the view of the pattern recognition camera 226 through the beam splitter 268 and to the general area of the measurement point 215 by being redirected by the beam splitter 252. Preferably, the mirror 274 may be mounted in the housing 236 as can be seen in FIG. 12. The pattern recognition camera 226 may be used for optically identifying components and/or features of such components for use with automated manufacturing techniques such as pattern recognition techniques. That is, for example, the pattern recognition camera 226 may be used together with appropriate pattern recognition software to optically recognize a feature, such as a flexure, head suspension, head suspension assembly, or other similar component. Once recognized, aspects of said feature, such as its spatial coordinates on a movable workpiece support such as the movable stage 144 may be utilized for process control. That is, the movable workpiece support may provide appropriate feedback to a motion control system, which may function cooperatively with the pattern recognition software component to controllably position and process a component in accordance with the present invention.

Figure 15:
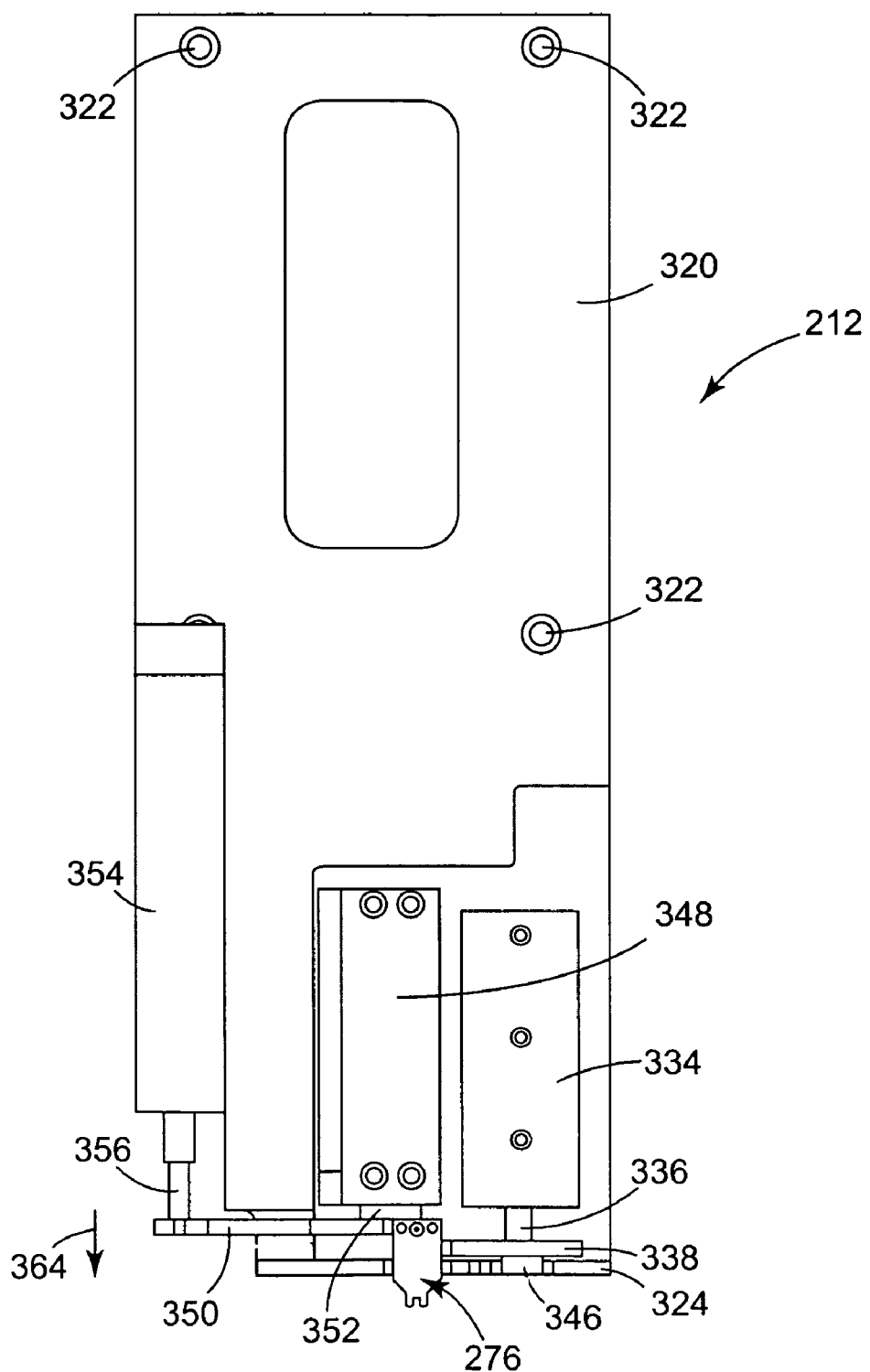
FIG. 15 is a front view of the adjust head assembly of FIG. 11 and showing in particular an adjust device.
Figure 16:
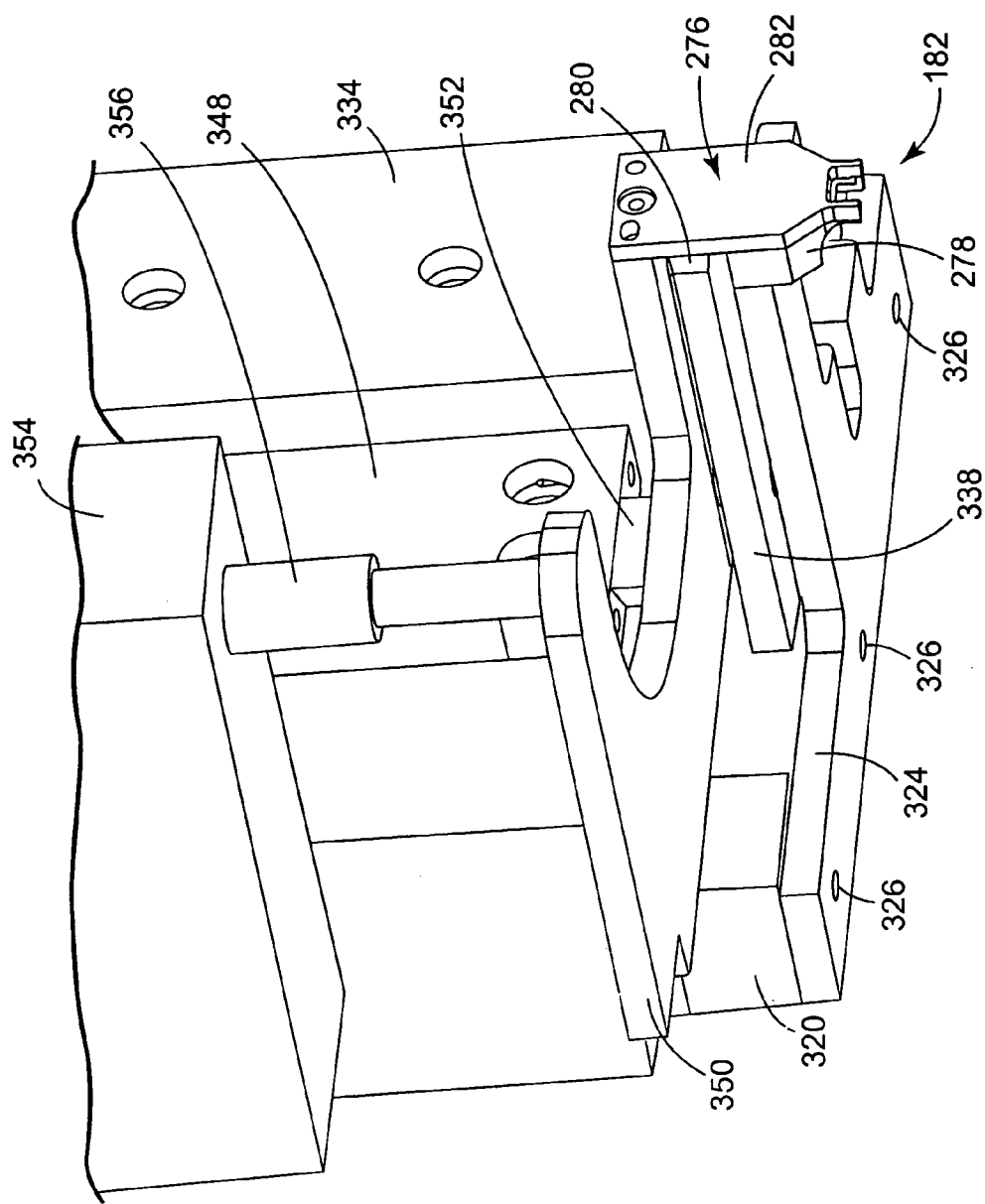
FIG. 16 is an enlarged partial perspective view of the adjust head assembly of FIG. 15 showing in particular the adjust device.

In FIG. 15 a front view of the adjust head assembly 212 is shown and in FIG. 16 a partial perspective view of a portion of the adjust head assembly 212 is shown. In particular, FIG. 16 illustrates a portion of the working region 182. Preferably, the adjust head assembly 212 includes an adjust device 276. A preferred adjust device 276 is illustrated in greater detail in FIGS. 17 and 18 and discussed below.

Figure 17:
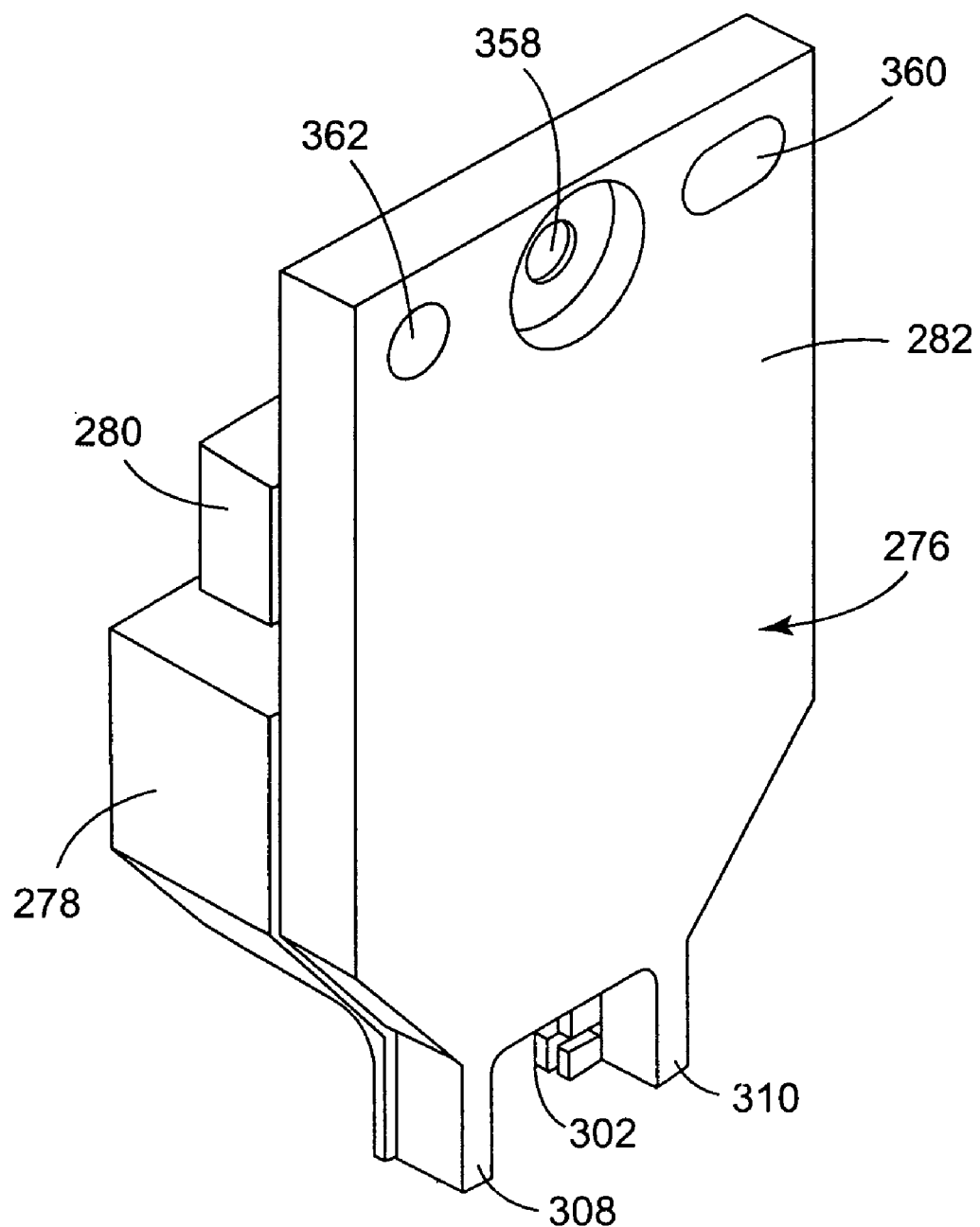
FIG. 17 is an enlarged perspective view of components of the adjust device of FIGS. 15 and 16 and showing in particular a stationary clamp portion, a movable clamp portion, and an adjust body.
Figure 18:
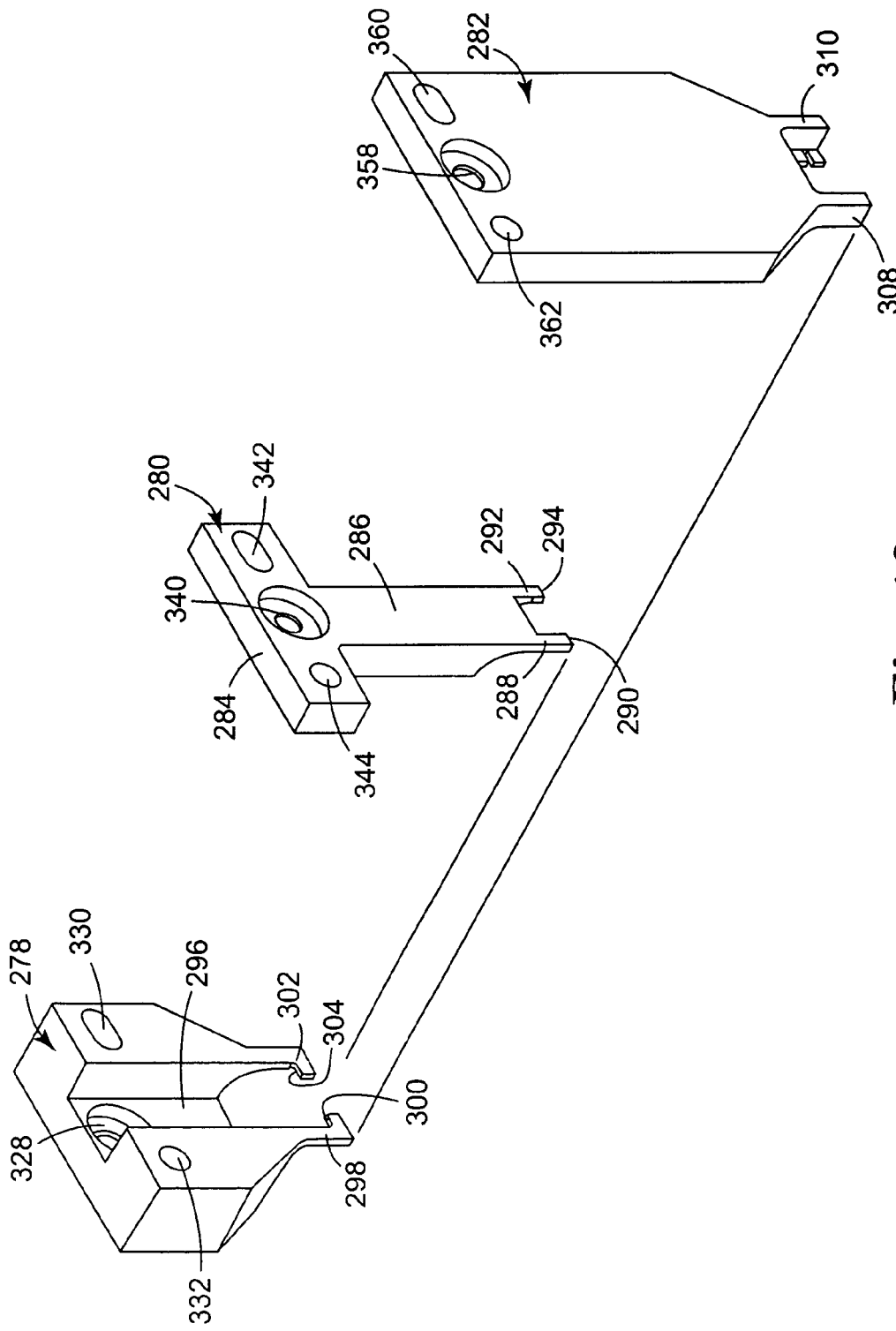
FIG. 18 is an exploded perspective view of the adjust device of FIG. 17 showing the stationary clamp portion, the movable clamp portion, and the adjust body.

Referring to both FIGS. 17 and 18, the illustrated adjust device 276 generally includes a stationary clamp portion 278, a movable clamp portion 280, and an adjust body 282. Preferably, the movable clamp portion 280 includes a base portion 284 and an extension body 286. Also, the body 286 preferably includes a first finger 288 having an engagement element 290 and a second finger 292 having an engagement element 294. In a preferred aspect of the present invention the engagement elements 290 and 294 comprise engagement surfaces. Preferably, the stationary clamp portion 278 includes an open channel 296 which can slidably receive the body 286, a first finger 298 having an engagement element 300, and a second finger 302 having an engagement element 304. In a preferred aspect of the present invention the engagement elements 300 and 304 comprise engagement surfaces. When operationally assembled, as shown in FIG. 17, the open channel 296 of the stationary clamp portion 278 can receive and slidingly engage the body 286 of the movable clamp portion 280. Preferably, when assembled as such, the engagement element 290 of the first finger 288 of the movable clamp portion 280 may be operatively positioned with respect to the engagement element 300 of the first finger 298 of the stationary clamp portion 278 so as to form generally parallel and substantially aligned surfaces usable for clamping or restraining a gimbal arm of a head suspension as described below. Also preferably, when assembled as described above the engagement element 294 of the second finger 292 of the movable clamp portion 280 may be operatively positioned with respect to the engagement element 304 of the second finger 302 of the stationary clamp portion 296 in accordance with the positioning of the first fingers described above. The preferred mounting of the stationary clamp portion 278 and the preferred mounting and motion actuation of the movable clamp portion 280 are described below with respect to FIGS. 15 and 16.

It is understood that the engagement elements 290, 294, 300, and 304 as comprising engagement surfaces are preferred exemplary engagement elements that may be used in accordance with the functional aspects of the present invention. Accordingly, the present invention is not limited to engagement elements comprising surfaces. That is, the engagement elements 290, 294, 300, and 304 may comprise surfaces, edges, spherically shaped elements, sharp points, or combinations thereof.

Further referring to FIGS. 17 and 18, the adjust device 276 also preferably includes the adjust body 282. As illustrated, the adjust body 282 preferably includes a first finger 308 and a second finger 310, which generally extend from the adjust body 282 in a similar direction as fingers 288 and 292 and fingers 298 and 302 of the moveable and stationary clamp portions 280 and 278, respectively. Referring to FIG. 20, the first finger 308 preferably includes a first engagement element 312 for engaging at least a portion of a component such as a gimbal arm of a head suspension or a head suspension assembly in a first direction and a second engagement element 314 for similarly engaging at least a portion of a similar component in a second direction. Preferably, said first and second engagement directions are generally opposite directions. Also, the second finger 310 preferably includes a similar first engagement element 316 and a similar second engagement element 318, which can also be seen in FIG. 20 and can more clearly be seen in the perspective illustration of FIG. 19. More preferably, the engagement elements 312, 314, 316, and 318, comprise generally flat surfaces as illustrated. It is understood, that the engagement elements 312, 314, 316, and 318, may comprise surfaces, edges, spherically shaped elements, sharp points, or combinations thereof. Providing first and second engagement elements for each finger permits component bending in two directions, as described below, and at two different side portions of a component to be mechanically bent. However, if bending is desired only in one direction, only a singe engagement element may be needed. Also, if only one component side portion or element is to be bent, only one such finger with one or more engagement elements may be provided. These variations will be better understood with the description of the adjustment operations set out below.

With reference to FIGS. 15 through 18 the preferred mounting and motion actuation of the adjust device 276 will be described in detail. First referring to FIG. 15, the adjust head assembly 212 generally includes a base plate 320 which may be used to mount the head adjust assembly 212 to the movable stage 178 shown in FIG. 7. Such mounting may be accomplished by appropriately utilizing mounting holes generally identified by reference numeral 322 and appropriate fasteners. Accordingly, the entire adjust head assembly 212 including the adjust device 276 may be translated with respect to the movable stage 144 as previously discussed.

Preferably, the adjust head assembly 212 includes a stationary plate 324 operatively mounted to the base plate 320 by using mounting holes and appropriate fasteners generally indicated by reference numeral 326 and as illustrated in FIG. 16. As shown in FIG. 16, the stationary clamp portion 278 is preferably attached to the stationary plate 324.

Referring to FIG. 18, the stationary clamp portion 278 preferably includes a mounting hole 328 for attaching the stationary clamp portion 278 to the stationary plate 324 by an appropriate fastener or the like. More preferably, the stationary clamp portion 278 includes a slot 330 and a hole 332 for engaging with a first and second pin (not shown) on the stationary plate 324 for precision alignment of the stationary clamp portion 278 with respect to the stationary plate 324. It is understood, that the stationary clamp portion 278 may be mounted directly to the base plate 320. That is, the stationary plate 324 may be formed as an integral part of the base plate 320.

Further referring to FIG. 15, the adjust head assembly 212 preferably includes an actuator 334 operatively attached to the base plate 320 and having an extendable shaft 336 attached to a movable plate 338 which is preferably attached to the movable clamp portion 280. Referring to FIG. 18, the movable clamp portion 280 preferably includes a mounting hole 340 for attaching the movable clamp portion 280 to the movable plate 338 by an appropriate fastener or the like. More preferably, the movable clamp portion 280 includes a slot 342 and a hole 344 for engaging with a first and second pin (not shown) on the movable plate 338 for precision alignment of the movable clamp portion 280 with respect to the movable plate 338. Also, as shown in FIG. 15, the adjust head assembly 212 preferably includes a hard stop 346 for engaging with a bottom surface of the movable plate 338 as illustrated thereby establishing a maximum extension of the movable plate 338 under the actuation of the extendable shaft 336 of the actuator 334. It is understood that the hard stop 346 may be an integral part of the fixed plate 324 or may be a separate part attached thereto as illustrated or may be integrated with the actuator 334. Additionally, the hard stop 346 may be adjustably positionable with respect to the stationary plate 324 for adjusting the allowable travel of the movable plate 338 for certain applications.

Further referring to FIG. 15, the adjust head device 212 preferably includes a linear motion guide device 348 such as a linear bearing or the like operatively mounted to the base plate 320 and operatively attached to a movable plate 350 by a coupling 352. Additionally, the adjust head device 212 preferably includes a linear actuator 354 operatively mounted to the base plate 320 and having an extendable shaft 356 as can be seen in both FIGS. 15 and 16. Also as can be seen in FIGS. 15 through 18, the adjust body 282 preferably includes a mounting hole 358 for attaching the adjust body 282 to the movable plate 350 by an appropriate fastener or the like. More preferably, the adjust body 282 includes a slot 360 and a hole 362 for engaging with a first and second pin (not shown) on the movable plate 350 for precision alignment of the adjust body 282 with respect to the movable plate 350. Preferably, the extendable shaft 356 of the actuator 354 can engage at least a portion of the movable plate 350 for moving the movable plate 350 against a bias of the linear actuator 354 and generally in the direction indicated by Arrow 364.

Figure 19:
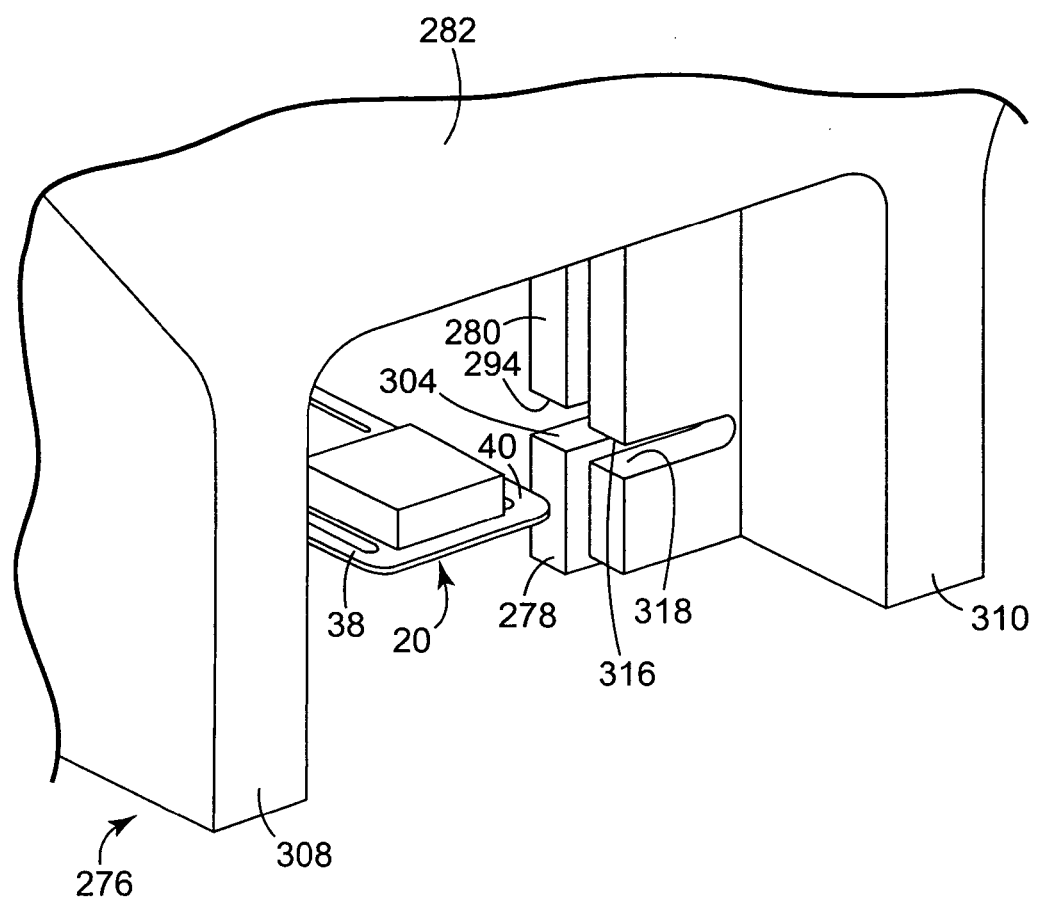
FIG. 19 is a further enlarged partial perspective view of a portion of the adjust device of FIG. 17 with a flexure of a head suspension assembly and showing in particular an engagement surface of the stationary clamp portion, an engagement surface of the movable clamp portion, and a first and second engagement surface of the adjust body.
Figure 20:
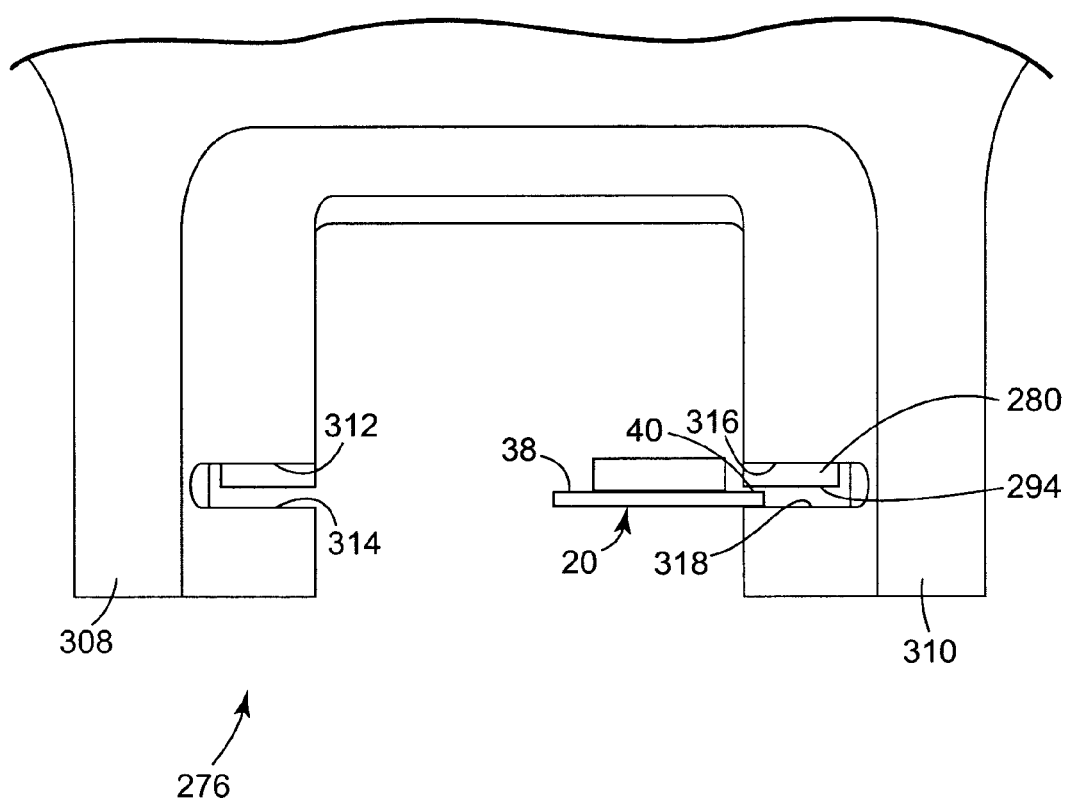
FIG. 20 is a partial front view of the adjust device of FIG. 19 and showing a gimbal arm of a head suspension assembly in a position with respect to the adjust device for processing by the adjust device.

With reference to FIG. 19 a portion of the adjust device 276 is shown schematically. Additionally, a portion of a flexure of a head suspension assembly such as the gimbal or flexure 20 illustrated in FIG. 2 is illustrated in FIG. 19 in a position to be processed in accordance with the present invention and as discussed below. Preferably, the head suspension assembly is supported by a workpiece support such as the sub tray discussed in detail above. As can be seen in FIG. 19, the engagement surface 294 of the movable clamp portion 280 is shown spaced apart from the engagement surface 304 of the stationary clamp portion 278. Accordingly, the movable clamp portion 280 is in a generally open position with respect to the stationary clamp portion 278. In the open position, a gimbal arm such as the gimbal arm 40 may be received between the engagement surface 294 and the engagement surface 304. As described above, the movable clamp portion 280 is preferably slidably engaged with the stationary clamp portion 278 and can be moved with respect to the stationary clamp portion 278 by the actuator 334 as described above. Accordingly, the movable clamp portion 280 can be moved to a generally closed position with respect to the stationary clamp portion 278 and as is described hereinafter. The same is preferably true with respect to the engagement surfaces 290 and 300 of the movable and stationary clamp portions 280 and 278, respectively, as they could clamp a different gimbal arm 38.

In FIG. 20, at least a portion of the gimbal arm 40 of the flexure 20 is shown inserted between the engagement surface 294 and the engagement surface 304 and wherein the movable clamp portion 280 is in the generally closed position with respect to the stationary clamp portion 278. In a preferred aspect of the present invention the engagement surface 294 of the movable clamp portion 280 and the engagement surface 304 of the movable clamp portion 278 are spaced apart at a distance, which is slightly greater than the thickness of the gimbal arm to be restrained when in the closed position. That is, it is preferred that the engagement surface 294 and the engagement surface 304 do not apply force or pressure to the gimbal arm that might damage the gimbal arm. Accordingly, the distance between the engagement surface 294 and the engagement surface 304 for the closed position may be determined empirically for a particular gimbal arm to be restrained, which closed position can be maintained by stop 346. As an example, for a gimbal arm having a thickness of about 0.0020 inches, a preferred spacing between the engagement surface 294 and the engagement surface 304 for the closed position could be about 0.0021 inches. Preferably, the spacing between the engagement surface 294 and the engagement surface 304 for the closed position is physically set by utilizing the hard stop 346 to limit the motion of the movable plate 338 under the movement of the actuator 334. That is, as mentioned above, the hard stop may be an adjustable hard stop or may be specifically chosen for a particular application to achieve a particular spacing between the engagement surface 294 and the engagement surface 304.

As can be seen in FIG. 20, the gimbal arm 38 of the head suspension assembly 20 may similarly be processed as described above by either moving the head suspension assembly 20 or by moving the adjust device 276 with respect to each other such that the gimbal arm 38 is generally positioned between the engagement surface 290 of the movable clamp portion 284 and the engagement surface 300 of the stationary clamp portion 278. Accordingly, each gimbal arm may be individually processed. It is understood, that the engagement surface 290 and the engagement surface 300 are preferably substantially similar to the engagement surface 294 and the engagement surface 304. As such, the preferred aspects of the engagement surface 294 and the engagement surface 304 described above are also preferred for the engagement surface 290 and the engagement surface 300.

Figure 21:
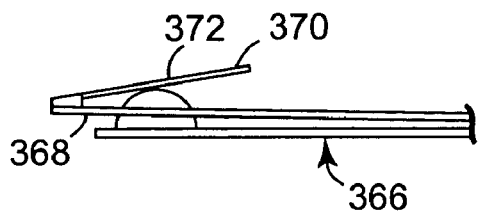
FIG. 21 is a schematic side view of a flexure of a head suspension showing in particular a gimbal arm of the flexure and a slider mounting tongue having a static attitude to be determined and adjusted.

In FIGS. 21 through 26, an exemplary method for adjusting a gimbal arm of a head suspension or a head suspension assembly by utilizing the adjust device 276 of the present invention is schematically illustrated. In FIG. 21, a portion of a typical flexure 366 of a typical head suspension is schematically illustrated. As shown, the flexure 366 includes a gimbal arm 368 and a slider mounting tongue 370 having a mounting surface 372. The mounting surface 372 of the slider mounting tongue 370 generally has a static attitude or planar orientation, which for certain applications may be determined and controllably adjusted to have a desired static attitude. In accordance with the present invention such static attitude of a slider mounting tongue or the static attitude of a slider may be adjusted by advantageously permanently deforming at least one gimbal arm of a head suspension or a head suspension assembly. And, for certain applications, an additional gimbal arm of a head suspension or head suspension assembly may be adjusted. As previously discussed, adjusting the static attitude by permanently deforming a gimbal arm is advantageous because the static attitude adjustment may be made independently of the load beam and the resonance characteristics of the load beam may remain undisturbed.

Figure 22:
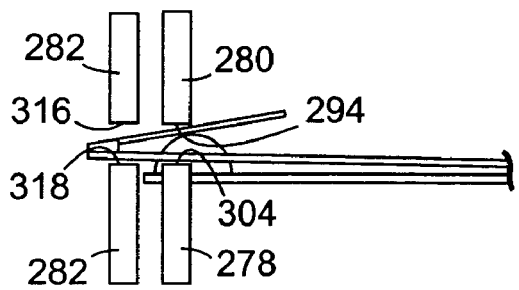
FIG. 22 is a schematic side view of the flexure of FIG. 21 and a schematic illustration of the adjust device and showing in particular the stationary clamp portion and the moveable clamp portion of the adjust device in an open position.
Figure 23:
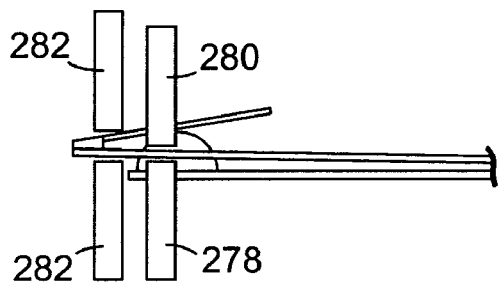
FIG. 23 is a schematic side view of the flexure and adjust device of FIG. 22 and showing in particular the stationary clamp portion and the movable clamp portion of the adjust device in a closed position.
Figure 24:
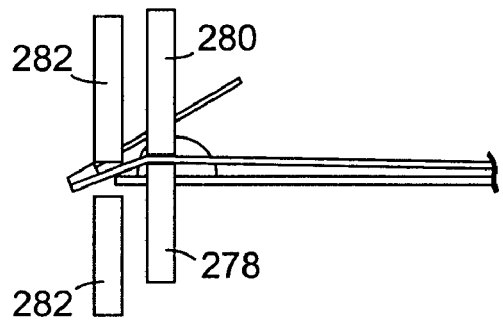
FIG. 24 is a schematic side view of the flexure and adjust device of FIG. 23 and showing in particular the stationary clamp portion and the movable clamp portion of the adjust device in a closed position and showing an engagement surface of the adjust body engaging with and bending a portion of the gimbal arm in a first direction.

Referring now to FIG. 22, a schematically illustrated portion of the typical flexure 366 and a schematically illustrated portion of the adjust device 276 are illustrated. In a preferred aspect of the present invention, the head suspension including the flexure 366 may preferably be supported and positioned by the sub-tray 190 and tray 184 as described above. As can be seen in FIG. 22, a portion of the gimbal arm 368 is shown positioned generally between the engagement surface 294 of the movable clamp portion 280 and the engagement surface 304 of the stationary clamp portion 278. Also, a portion of the gimbal arm 368 is shown positioned between the engagement surface 316 and the engagement surface 318 of the adjust body 282. Such positioning of the gimbal arm 368 with respect to the movable clamp portion 280, stationary clamp portion 270, and the adjust body 282 may be accomplished by the motion of the movable stage 144 and the movable stage 178 as described above. When at least a portion of the gimbal arm 368 is positioned at a desired position with respect to the adjust device 276, which position may also be empirically determined, the movable clamp portion 280 may be actuated by the actuator 334 such that the movable plate 338 engages with the hard stop 346 to bring the movable clamp portion 280 and the stationary clamp portion 278 to a closed position as is illustrated in FIG. 23. In such a closed position, at least a portion of the gimbal arm 368 may be restrained in accordance with the functional aspects of the present invention.

With at least a desired portion of the gimbal arm 368 restrained by the movable clamp portion 280 and the stationary clamp portion 278 the adjust body 282 may be moved in a direction to engage either the engagement surface 316 or the engagement surface 318 with at least a portion of the gimbal arm 368 for permanently deforming the gimbal arm 368. Such motion may be accomplished by actuating the actuator 354 and thereby moving the movable plate 350 as is guided by the linear guide device 348 as described above with respect to FIG. 15. Accordingly, such permanent deformation of a gimbal arm can adjust the static attitude or planar orientation of the surface 372 of the slider mounting tongue 370 by bending action described above. Such bending action preferably introduces a permanent deformation of the gimbal arm, which accordingly changes the position the slider mounting tongue that is attached thereto and thereby adjusts the static attitude of the slider mounting tongue. As such, in FIG. 24, the adjust body 282 is shown with the engagement surface 316 engaging a portion of the gimbal arm 368 and thereby mechanically bending the gimbal arm 368 while at least a portion of the gimbal arm 368 is restrained by the movable clamp portion 280 and the stationary clamp portion 278. Generally, such bending may be in a direction generally opposite from that desired to adjust the static attitude or may be in an arbitrary direction and is generally referred to as a pre-bend. A pre-bend step is optional but is preferred because it has been discovered that a pre-bend step generally results in a more accurate and more stable bending step for adjustment as described below.

Figure 25:
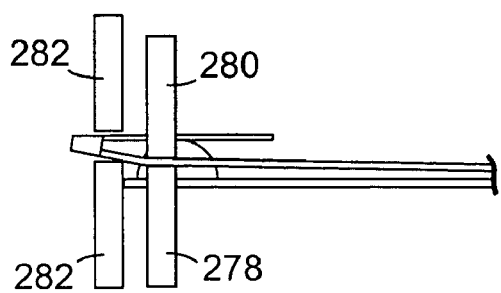
FIG. 25 is a schematic side view of the flexure and adjust device of FIG. 23 and showing in particular the stationary clamp portion and the movable clamp portion of the adjust device in a closed position and showing an engagement surface of the adjust body engaging with and bending a portion of the gimbal arm in a second direction.
Figure 26:
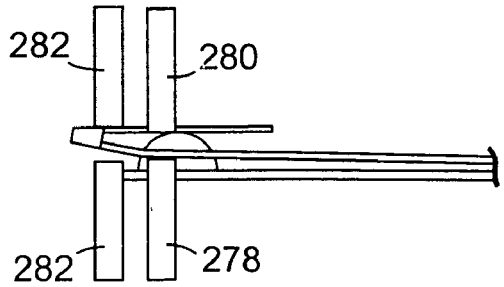
FIG. 26 is a schematic side view of the flexure and adjust device of FIG. 25 showing the stationary clamp portion and the movable clamp portion of the adjust device in an open position and showing the slider mounting tongue having an adjusted static attitude.

In FIG. 25, the engagement surface 318 of the adjust body 282 is shown engaging a portion of the gimbal arm 368 and thereby mechanically deforming, by bending, the gimbal arm 368 in a direction that may adjust the static attitude as desired while at least a portion of the gimbal arm 368 is restrained by the movable clamp portion 280 and the stationary clamp portion 278. Preferably, such a bending step is performed after the pre-bend step described above; however, the bending step may be performed without performing a pre-bend.

If necessary, the above-described bending steps may be repeated while at least a portion of the gimbal arm 368 is restrained by the movable clamp portion 280 and the stationary clamp portion 278. When the desired planar orientation or static attitude is achieved the movable clamp portion 280 may be moved to the open position as described above such that the flexure 366 may be generally removed from the adjust device 276. It is understood, that for certain applications, an additional gimbal arm may be permanently deformed in order to achieve the desired static attitude or planar orientation. Accordingly, referring to FIG. 20, it can be seen that either the gimbal arm 38 or the gimbal arm 40 may be processed by the adjust device 276 by appropriately positioning the adjust device 276 with respect to the desired gimbal arm to be adjusted. As such, each gimbal arm of a flexure having two gimbal arms such as the flexure 20 illustrated in FIG. 20 may be independently adjusted.

In accordance with the present invention, the above-described bending step may preferably be correlated to a determination of the static attitude. That is, a desired or target static attitude may be determined. As described above, determination of the static attitude or of the planar orientation of a surface may preferably be accomplished by utilizing the preferred measurement probe 214. For example, the planar orientation of a slider mounting tongue or a slider to be adjusted may be determined and the above-described adjustment may be performed and the planar orientation remeasured until a desired planar orientation is accomplished. Additionally, the planar orientation of a reference surface may also preferably be determined and then utilized to accomplish a desired adjustment to the static attitude of the slider mounting tongue or the slider. That is, the planar orientation of a surface such as a surface of a load beam, flexure, gimbal arm, or any other surface may be used as a reference surface. In certain aspects of the present invention, a predictable relationship between the static attitude of head suspensions or head suspension assemblies in an unloaded state and a loaded state may be determined by measuring both the static attitude and the planar orientation of a reference surface such as a surface of a load beam.

Numerous characteristics and advantages of the invention meant to be described by this document have been set forth in the foregoing description. It is to be understood, however, that while particular forms or embodiments of the invention have been illustrated, various modifications, including modifications to shape, and arrangement of parts, and the like, can be made without departing from the spirit and scope of the invention.

What is claimed is:

1. An optical measurement device for determining the planar orientation of a surface, the device comprising:
   a focusing lens having a focal axis and a focal point positioned on the focal axis, the focusing lens being positioned between the focal point of the lens and a detector operatively positioned on the focal axis of the lens;
   a beam splitter operatively positioned on the focal axis of the focusing lens and positioned between the focal point of the focusing lens and the detector;
   a light source directed toward the beam splitter wherein the light source can impinge upon the beam splitter and be redirected by the beam splitter to follow the focal axis of the focusing lens to the focal point of the focusing lens; and
   a mask having an aperture, the mask operatively and adjustably positioned between the light source and the beam splitter so that the aperture can be adjusted with respect to a light beam from the light source and to define the size and shape of the light source;
   wherein the focal point of the lens can be positioned on a surface to determine the planar orientation of the surface.

2. The device of claim 1, wherein the detector comprises a charge-coupled device.

3. The device of claim 1, wherein the light source comprises a laser.

4. The device of claim 3, wherein the laser has a wavelength of about 670 nanometers.

5. The device of claim 1, further including an imaging lens operatively positioned on the focal axis of the focusing lens and positioned between the detector and the focusing lens.

6. The device of claim 1, further including an absorptive filter operatively positioned on the focal axis of the focusing lens and positioned between the detector and the focusing lens.

7. The device of claim 1, further including an imaging lens operatively positioned on the focal axis of the focusing lens and positioned between the detector and the focusing lens and an absorptive filter operatively positioned on the focal axis of the focusing lens and positioned between the detector and the focusing lens wherein the absorptive filter is positioned between the detector and the imaging lens.

8. A non-contact optical measurement device for determining the planar orientation of a surface, the device comprising:
   a focusing lens having a focal axis and a focal point positioned on the focal axis, the focusing lens being positioned between the focal point of the lens and a detector operatively positioned on the focal axis of the lens;
   a beam splitter operatively positioned on the focal axis of the focusing lens and positioned between the focusing lens and the focal point of the focusing lens; and
   a light source for providing a light beam directed toward the beam splitter at an angle greater than zero to the focal axis of the focusing lens, wherein the light beam can impinge upon the beam splitter and be redirected by the beam splitter to follow the focal axis of the focusing lens to the focal point of the focusing lens;
   wherein the focal point of the lens can be positioned on a surface to determine the planar orientation of the surface.

9. The device of claim 8, wherein the detector comprises a charge-coupled device.

10. The device of claim 8, wherein the light source comprises a laser that has a wavelength of about 670 nanometers.

11. The device of claim 8, further including an imaging lens operatively positioned on the focal axis of the focusing lens and positioned between the detector and the focusing lens.

12. The device of claim 8, further including an absorptive filter operatively positioned on the focal axis of the focusing lens and positioned between the detector and the focusing lens.

13. The device of claim 8, further including an imaging lens operatively positioned on the focal axis of the focusing lens and positioned between the detector and the focusing lens and an absorptive filter operatively positioned on the focal axis of the focusing lens and positioned between the detector and the focusing lens wherein the absorptive filter is positioned between the detector and the imaging lens.

14. The device of claim 8, further including a mask having an aperture operatively positioned between the light source and the beam splitter that can define the size and shape of the light source.

15. The device of claim 14, further including a means for movably positioning the aperture of the mask for controllably adjusting the position of the light source.

16. A non-contact optical measurement device for determining the planar orientation of a surface, the device comprising:
   a focusing lens having a focal axis and a focal point positioned on the focal axis, the focusing lens being positioned between the focal point of the lens and a detector operatively positioned on the focal axis of the lens;
   a first beam splitter operatively positioned on the focal axis of the focusing lens and positioned between the focusing lens and the focal point of the focusing lens;
   a second beam splitter operatively positioned with respect to the first beam splitter that can redirect light that impinges on the second beam splitter towards the first beam splitter; and
   a light source for providing a light beam directed toward the second beam splitter wherein the light beam can impinge upon the second beam splitter and be redirected by the second beam splitter to impinge upon the first beam splitter at an angle greater than zero to the focal axis of the focusing lens and be redirected by the first beam splitter to follow the focal axis of the focusing lens to the focal point of the focusing lens;
   wherein the focal point of the lens can be positioned on a surface to determine the planar orientation of the surface.

17. The device of claim 16, further including an image generating device operatively positioned with respect to the second beam splitter that can generate an image of the area around the focal point of the focusing lens by receiving light from the area around the focal point of the focusing lens that is directed by the first beam splitter and the second beam splitter.

18. The device of claim 17, wherein the image generating device includes a camera.

19. The device of claim 17, wherein the image generating device includes a microscope.

20. The device of claim 16, wherein the detector comprises a charge-coupled device.

21. The device of claim 16, wherein the light source comprises a laser that has a wavelength of about 670 nanometers.

22. The device of claim 16, further including an imaging lens operatively positioned on the focal axis of the focusing lens and positioned between the detector and the focusing lens.

23. The device of claim 16, further including an absorptive filter operatively positioned on the focal axis of the focusing lens and positioned between the detector and the focusing lens.

24. The device of claim 16, further including an imaging lens operatively positioned on the focal axis of the focusing lens and positioned between the detector and the focusing lens and an absorptive filter operatively positioned on the focal axis of the focusing lens and positioned between the detector and the focusing lens wherein the absorptive filter is positioned between the detector and the imaging lens.

25. The device of claim 16, further including a mask having an aperture operatively positioned between the light source and the beam splitter that can define the size and shape of the light source.

26. The device of claim 25, further including a means for movably positioning the aperture of the mask for controllably adjusting the position of the light source.

* * * * *